(12) United States Patent
Kim et al.

(10) Patent No.: US 10,708,777 B2
(45) Date of Patent: Jul. 7, 2020

(54) METHOD AND APPARATUS FOR CONNECTION BETWEEN ELECTRONIC DEVICES

(71) Applicant: Samsung Electronics Co., Ltd., Gyeonggi-do (KR)

(72) Inventors: Hakjoo Kim, Gyeonggi-do (KR); Yong-Jun Park, Gyeonggi-do (KR); Gwiho Lee, Gyeonggi-do (KR); Ho-Dong Jwa, Gyeonggi-do (KR); Ji Young Kim, Gyeonggi-do (KR); Sangho Park, Gyeonggi-do (KR); Hyunseung Lee, Seoul (KR); Wooyoung Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 245 days.

(21) Appl. No.: 15/783,451

(22) Filed: Oct. 13, 2017

(65) Prior Publication Data

US 2018/0109947 A1 Apr. 19, 2018

(30) Foreign Application Priority Data

Oct. 14, 2016 (KR) .................. 10-2016-0133817

(51) Int. Cl.
*G06F 21/00* (2013.01)
*H04W 12/06* (2009.01)
(Continued)

(52) U.S. Cl.
CPC ............ *H04W 12/06* (2013.01); *G06F 21/30* (2013.01); *G06F 21/33* (2013.01); *G06F 21/34* (2013.01);
(Continued)

(58) Field of Classification Search
CPC .......... G06F 21/30; G06F 21/31; G06F 21/32; G06F 21/34; G06F 21/33; G06F 21/44;
(Continued)

(56) References Cited

U.S. PATENT DOCUMENTS

| 2014/0196142 A1* | 7/2014 | Louboutin ............... G06F 21/44 726/16 |
| 2015/0207626 A1* | 7/2015 | Neftel .................... G08C 17/02 713/168 |
| 2016/0241405 A1 | 8/2016 | Jeong et al. |

FOREIGN PATENT DOCUMENTS

| KR | 1020110071201 | 6/2011 |
| KR | 101271464 | 6/2013 |

(Continued)

*Primary Examiner* — Edward Zee
(74) *Attorney, Agent, or Firm* — The Farrell law Firm, P.C.

(57) ABSTRACT

Disclosed are a method and an apparatus for connecting electronic devices based on biometric information without a certification server. An electronic device includes a wireless communication unit configured to perform wireless communication with an external device; a biometric recognition module; a memory; and a processor connected to the wireless communication unit, the biometric recognition module, and the memory. The processor is configured to register, in the external device, authentication information for authenticating the external device through the electronic device, establish a communication connection with the external device through the wireless communication unit, receive a request for authenticating the electronic device from the external device in response to the communication connection, acquire biometric information corresponding to a user of the electronic device using the biometric recognition module in response to the authentication request, perform device authentication for the user based on at least the biometric information, encrypt authentication information (Continued)

when the authentication is successfully performed, and transmit the encrypted authentication information to the external device.

6 Claims, 19 Drawing Sheets

(51) Int. Cl.
| | | |
|---|---|---|
| *H04W 12/10* | (2009.01) | |
| *H04L 29/06* | (2006.01) | |
| *G06F 21/33* | (2013.01) | |
| *G06F 21/30* | (2013.01) | |
| *G06F 21/34* | (2013.01) | |
| *G06F 21/45* | (2013.01) | |
| *H04W 12/04* | (2009.01) | |
| *H04W 12/08* | (2009.01) | |

(52) U.S. Cl.
CPC .......... *G06F 21/45* (2013.01); *H04L 63/0435* (2013.01); *H04L 63/0442* (2013.01); *H04L 63/061* (2013.01); *H04L 63/0861* (2013.01); *H04L 63/126* (2013.01); *H04W 12/04* (2013.01); *H04W 12/08* (2013.01); *H04W 12/10* (2013.01)

(58) Field of Classification Search
CPC . G06F 21/45; H04L 63/0823; H04L 63/0853; H04L 63/0861
See application file for complete search history.

(56) References Cited

FOREIGN PATENT DOCUMENTS

| | | |
|---|---|---|
| KR | 101621044 | 5/2016 |
| KR | 1020160099922 | 8/2016 |
| KR | 1020160104603 | 9/2016 |

* cited by examiner

METHOD AND APPARATUS FOR CONNECTION BETWEEN ELECTRONIC DEVICES

PRIORITY

This application claims priority under 35 U.S.C. § 119(a) to a Korean Patent Application filed in the Korean Intellectual Property Office on Oct. 14, 2016, and assigned Serial No. 10-2016-0133817, the entire content of which is incorporated herein by reference.

BACKGROUND

1. Field of the Disclosure

The present disclosure relates to a method and an apparatus for connecting electronic devices based on biometric information without a certification server.

2. Description of Related Art

Recently, with the development of digital technology, various types of electronic devices, such as mobile communication terminals, smart phones, tablet Personal Computers (PCs), notebooks, Personal Digital Assistants (PDAs), wearable devices, digital cameras, or PCs, have come to be widely used.

As the importance of personal information protection has increased, electronic devices have come to provide various services related to user authentication based on users' biometric information. Biometric information corresponds to unique and characteristic information of a user, and may include, for example, a fingerprint, iris, or voice. Such biometric information is very effective in terms of security and user convenience, and many electronic devices use biometric information as information for user authentication.

However, only electronic devices having a biometric sensor (for example, a fingerprint recognition sensor) configured to recognize (sense) biometric information therein or connected to a separated device (for example, a fingerprint reader) including the biometric sensor are capable of performing user authentication using biometric information. Accordingly, the performance of biometric information-based user authentication is very limited depending on the electronic device.

SUMMARY

An aspect of the present disclosure provides an apparatus and a method for connecting a first electronic device that includes a biometric recognition module and a second electronic device that does not include a biometric recognition module.

An aspect of the present disclosure provides an apparatus and a method for increasing connection convenience and security in connection between the first electronic device and the second electronic device.

An aspect of the present disclosure provides an apparatus and a method for providing connection, authentication, service (function or application) link, or management with the second electronic device based on biometric information acquired through the biometric recognition module of the first electronic device.

An aspect of the present disclosure provides an apparatus and a method for, when the first electronic device is registered as a companion device of the second electronic device and the second electronic device is authenticated through the first electronic device, improving usability by simplifying a registration and authentication procedure and increasing security.

An aspect of the present disclosure provides an apparatus and a method for linking a public-key-based authentication scheme and a symmetric-key-based authentication scheme between the first electronic device and the second electronic device and performing the symmetric-key authentication without exposing the symmetric key to the outside In accordance with an aspect of the present disclosure, an electronic device is provided. The electronic device includes a wireless communication unit configured to perform wireless communication with an external device; a biometric recognition module; a memory; and a processor connected to the wireless communication unit, the biometric recognition module, and the memory, wherein the processor is configured to register, in the external device, authentication information for authenticating the external device through the electronic device, establish a communication connection with the external device through the wireless communication unit, receive a request for authenticating the electronic device from the external device in response to the communication connection, acquire biometric information corresponding to a user of the electronic device using the biometric recognition module in response to the authentication request, perform device authentication for the user based on at least the biometric information, encrypt authentication information when the authentication is successfully performed, and transmit the encrypted authentication information to the external device.

In accordance with another aspect of the present disclosure, an electronic device is provided. The electronic device includes a wireless communication unit configured to perform wireless communication with an external device; a memory; and a processor connected to the wireless communication unit and the memory, wherein the processor is configured to register the external device as a companion device of the electronic device based on authentication information of the external device, establish a communication connection with the external device through the wireless communication unit, transmit an authentication request to the external device in response to the communication connection, receive authentication information from the external device in response to the authentication request, identify a signature for the received authentication information, and process authentication of the electronic device through the external device when the signature of the authentication information is identified.

In accordance with another aspect of the present disclosure, a method of operating an electronic device is provided. The method includes registering, in an external device, authentication information for authenticating the external device through the electronic device; establishing a communication connection with the external device through a wireless communication unit; receiving a request for authenticating the electronic device from the external device in response to the communication connection; acquiring biometric information corresponding to a user of the electronic device using a biometric recognition module in response to the authentication request; performing device authentication for the user based on at least the biometric information; encrypting authentication information when the authentication is successfully performed; and transmitting the encrypted authentication information to the external device.

In accordance with another aspect of the present disclosure, a method of operating an electronic device is provided. The method includes registering an external device as a companion device of the electronic device based on authentication information of the external device; establishing a communication connection with the external device through a wireless communication unit; transmitting an authentication request to the external device in response to the communication connection; receiving authentication information from the external device in response to the authentication request; identifying a signature for the received authentication information; and processing authentication of the electronic device through the external device when the signature of the authentication information is identified.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1:
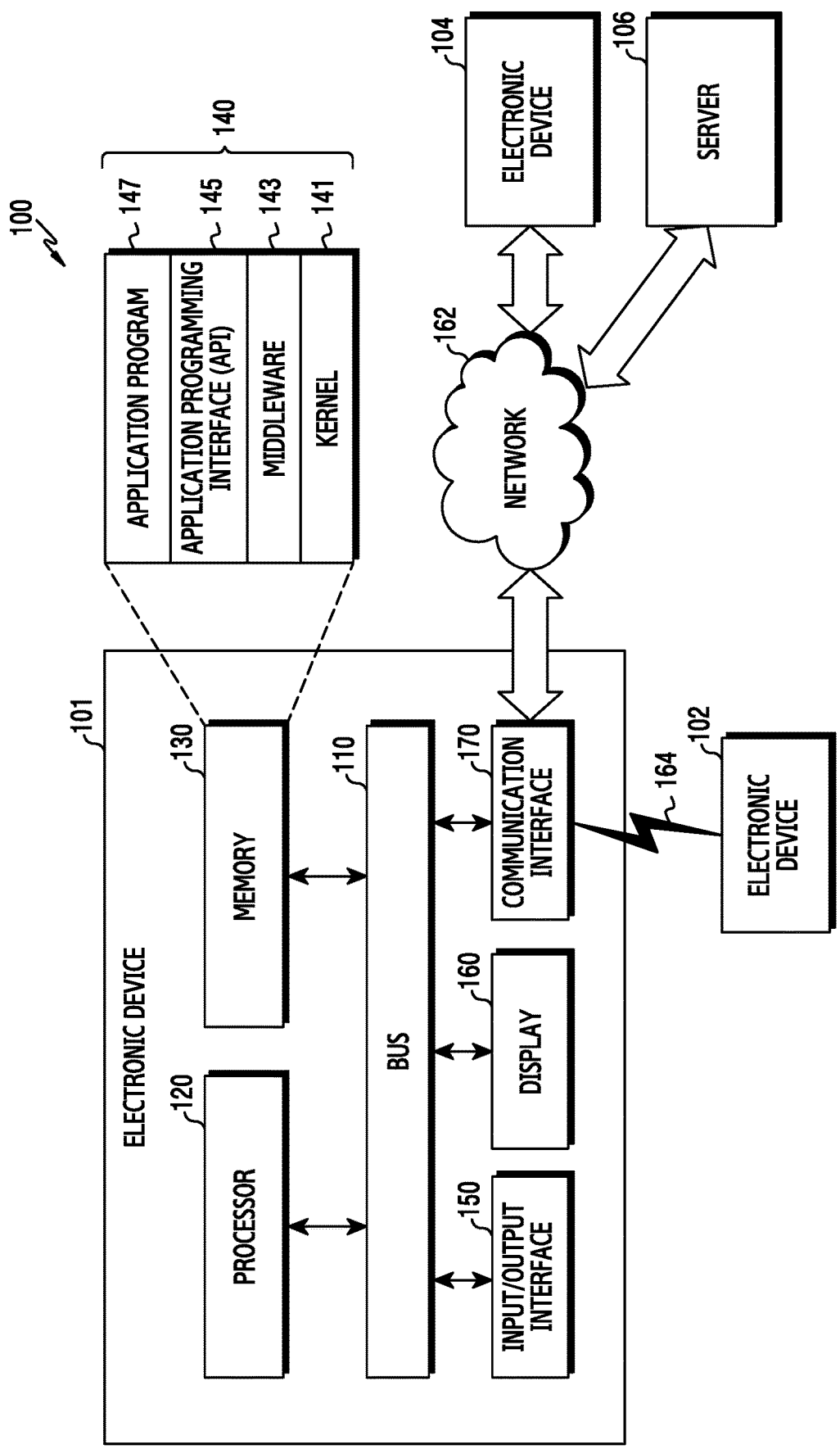
FIG. 1 illustrates a network environment including an electronic device according to embodiments of the present disclosure.

Hereinafter, embodiments of the present disclosure will be described with reference to the accompanying drawings, in which similar reference numerals may be used to refer to similar elements. However, it should be understood that there is no intent to limit the present disclosure to the particular forms disclosed herein; rather, the present disclosure should be construed to cover various modifications, equivalents, and/or alternatives of embodiments of the present disclosure. In the present disclosure, the expressions "have", "may have", "include", and "may include" refer to the existence of a corresponding feature (e.g., numeral, function, operation, or constituent element such as component), and do not exclude one or more additional features. In the present disclosure, the expressions such as "A or B", "at least one of A or/and B", and "one or more of A or/and B" may include all possible combinations of the items listed. For example, the expressions "A or B", "at least one of A and B", or "at least one of A or B" refer to all of (1) including at least one A, (2) including at least one B, or (3) including all of at least one A and at least one B. The expressions "a first", "a second", "the first", and "the second" used in the present disclosure, may modify various components regardless of the order and/or the importance but do not limit the corresponding components. For example, a first user device and a second user device indicate different user devices although both are user devices. For example, a first element may be referred to as a second element, and similarly, a second element may be referred to as a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there is no intervening element (e.g., third element) interposed between them.

The expression "configured to" may be used interchangeably with, for example, the expressions "suitable for", "having the capacity to", "designed to", "adapted to", "made to", or "capable of" according to the situation. The expression "configured to" may not necessarily imply "specifically designed to" in hardware. Alternatively, in some situations, the expression "device configured to" may indicate that the device, together with other devices or components, "is able to". For example, the phrase "processor adapted (or configured) to perform A, B, and C" may refer to a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the same meaning as the contextual meaning in the relevant field of art, and are not to be interpreted to have ideal or excessively formal meanings unless clearly defined in the present disclosure. In some cases, even terms defined in the present disclosure should not be interpreted to exclude embodiments of the present disclosure.

An electronic device, according to an embodiment of the present disclosure may include at least one of, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), an MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). The electronic device may be a home appliance, and may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

An electronic device may include at least one of a medical device (e.g., a portable medical measuring device (e.g., a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, or an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), an avionics device, security devices, an automotive head unit, a robot for home or industry, an automatic teller machine (ATM), a point of sales (POS) device, or an Internet of Things device (e.g., a light bulb, a sensor, electric or gas meter, a sprinkler device, a fire alarm, a thermostat, a streetlamp, a toaster, a sporting goods, a hot water tank, a heater, or a boiler, etc.).

An electronic device may include at least one of a part of furniture or a building/structure, an electronic board, an electronic signature receiving device, a projector, and a measuring instrument (e.g., a water meter, an electric meter, a gas meter, or a radio wave meter). The electronic device of the present disclosure may be a combination of one or more of the aforementioned various devices. The electronic device of the present disclosure may be a flexible device. Further, the electronic device of the present disclosure is not limited to the aforementioned devices, and may include a new electronic device according to the development of new technologies. Hereinafter, an electronic device will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to embodiments of the present disclosure.

An electronic device 101 within a network environment 100 will be described with reference to FIG. 1. The electronic device 101 includes a bus 110, a processor 120, a memory 130, an input/output interface 150, a display 160, and a communication interface 170. According to an embodiment of the present disclosure, the electronic device 101 may omit at least one of the above components or may further include other components.

The bus 110 is a circuit which interconnects the components 110 to 170 and delivers a communication (e.g., a control message and/or data) between the components 110 to 170.

The processor 120 may include one or more of a CPU, an AP, and a communication processor (CP). The processor 120 may carry out calculations or data processing relating to control and/or communication of at least one other component of the electronic device 101.

The memory 130 may include a volatile memory and/or a non-volatile memory. The memory 130 may store commands or data relevant to the other components of the electronic device 101. The memory 130 may store software and/or a program 140. The program 140 includes a kernel 141, middleware 143, an application programming interface (API) 145, and/or application program 147. At least some of the kernel 141, the middleware 143, and the API 145 may be referred to as an operating system (OS).

The memory 130 may store one or more programs executed by the controller 120, and may perform a function of temporarily storing inputted/outputted data. Input/output data may include various pieces of data related to device authentication (e.g., an authenticator, device information, and authentication keys (e.g., a symmetric key and a public key), a moving image, a still image, a picture, or an audio file. The memory 130 may serve to store acquired data and data acquired in real time may be stored in a temporary storage device (e.g., buffer) or data which is determined to be stored may be stored in a storage device which can store data for a long time. The memory 130 may include a computer readable recording medium to record one or more programs executed by the controller 120.

The kernel 141 may control or manage system resources (e.g., the bus 110, the processor 120, or the memory 130) used for performing an operation or function implemented in the other programs (e.g., the middleware 143, the API 145, or the application program 147). Furthermore, the kernel 141 may provide an interface through which the middleware 143, the API 145, or the application program 147 may access the individual components of the electronic device 101 to control or manage the system resources.

The middleware 143 may serve as an intermediary for allowing the API 145 or the application program 147 to communicate and exchange data with the kernel 141. Also, the middleware 143 may process one or more task requests received from the application program 147 according to priorities thereof. For example, the middleware 143 may assign priorities for using the system resources (e.g., the bus 110, the processor 120, the memory 130, or the like) of the electronic device 101, to at least one of the application program 147. For example, the middleware 143 may perform scheduling or loading balancing on the one or more task requests by processing the one or more task requests according to the priorities assigned thereto.

The API 145 is an interface through which the application 147 control functions provided from the kernel 141 or the middleware 143, and may include at least one interface or function (e.g., instruction) for file control, window control, image processing, character control, and the like.

The input/output interface 150 may function as an interface that may transfer commands or data input from a user or another external device to the other element(s) of the electronic device 101. Furthermore, the input/output interface 150 may output the commands or data received from the other element(s) of the electronic device 101 to the user or another external device. For example, a wire/wireless headphone port, an external charger port, a wire/wireless data port, a memory card port, an audio input/output port, a video input/output port, an earphone port, or the like may be included in the interface 150.

Examples of the display 160 may include a liquid crystal display (LCD), a light-emitting diode (LED) display, an organic light-emitting (OLED) display, a microelectromechanical systems (MEMS) display, and an electronic paper display. The display 160 may display various types of contents (e.g., text, images, videos, icons, or symbols) to users. The display 160 may include a touch screen, and may receive a touch, gesture, proximity, or hovering input using an electronic pen or a user's body part.

The display 160 may show a visual output to the user, for example. The visual output may be displayed in the form of a text, a graphic, or a video or a combination thereof. The display 160 may display (output) a variety of information processed in the electronic device 101. For example, the display 160 may display a user interface (UI) or a graphic user interface (GUI) related to the use of the electronic device.

The display 160 may display various user interfaces (e.g., UIs or GUIs) associated with the operation performed by the electronic device 101.

According to embodiments of the present disclosure, the display 160 may include a flat display or a curved display (or a bended display) which may be warped, bent, or rolled without damage thanks to a paper-thin and flexible substrate thereof. The curved display may maintain the bent form while being coupled to a housing (e.g., a bezel or a body). The electronic device 101 may be implemented as a display device, such as a flexible display which may be freely folded and unfolded. The display 160 may have foldable flexibility by replacing a glass substrate surrounding a liquid crystal of an LCD, an LED, an OLED, or an active matrix OLED (AMOLED) with a plastic film. The display 160 may extend to at least one side (e.g., at least one of the left side, right side, top side, and bottom side) of the electronic device 101 and may be coupled to the side of the housing while being folded with a radius of curvature (e.g., 5 cm, 1 cm, 7.5 mm, 5 mm, or 4 mm) at which the curved display can operate or lower.

The communication interface 170 may establish communication between the electronic device 101 and a first external electronic device 102, a second external electronic device 104, or a server 106. For example, the communication interface 170 may be connected to a network 162 through wireless communication or wired communication to communicate with the second external electronic device 104 or the server 106.

The wireless communication may include cellular communication using at least one of, for example, long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), or the like.

The wireless communication may include at least one of wireless fidelity (WiFi), light fidelity (LiFi), wireless gigabit alliance (WiGig), Bluetooth, Bluetooth low energy (BLE), Zigbee, near field communication (NFC), magnetic secure transmission, radio frequency (RF), or a body area network (BAN).

The wireless communication may include global navigation satellite system (GNSS). The GNSS may include global positioning system (GPS), global navigation satellite system (Glonass), BeiDou navigation satellite system (BeiDou) or Galileo, the European global satellite-based navigation system. Hereinafter, the terms GPS and GNSS may be interchangeably used in the following descriptions.

The wired communication may include at least one of a universal serial bus (USB), a high-definition multimedia interface (HDMI), a recommended standard-232 (RS-232), power line communication, or a plain old telephone service (POTS).

The network 162 may include at least one of telecommunications networks, for example, a computer network (e.g., local area network (LAN) or wide area network (WAN)), the Internet, or a telephone network.

Each of the first and second external electronic devices 102 and 104 may be the same type or different type of device as or from the electronic device 101 (e.g., a smart phone, a tablet PC, a remote controller, or the like). All or a part of operations that the electronic device 101 will perform may be executed by the external electronic devices 102 and 104 and/or the server 106. When the electronic device 101 executes any function or service automatically or in response to a request, the electronic device 101 may not perform the function or the service internally, but it may request at least a portion of a function associated with the electronic device 101 at the electronic device 102 or 104 and/or the server 106. The other electronic device may execute the requested function or additional function and may transmit the execution result to the electronic device 101. The electronic device 101 may provide the requested function or service using the received result or may additionally process the received result to provide the requested function or service. To achieve this, cloud computing, distributed computing, or client-server computing may be used.

The server 106 may include at least one of a certification server, an integration server, a provider server (or a communication service provider server), a content server, an Internet server, and a cloud server.

Figure 2:
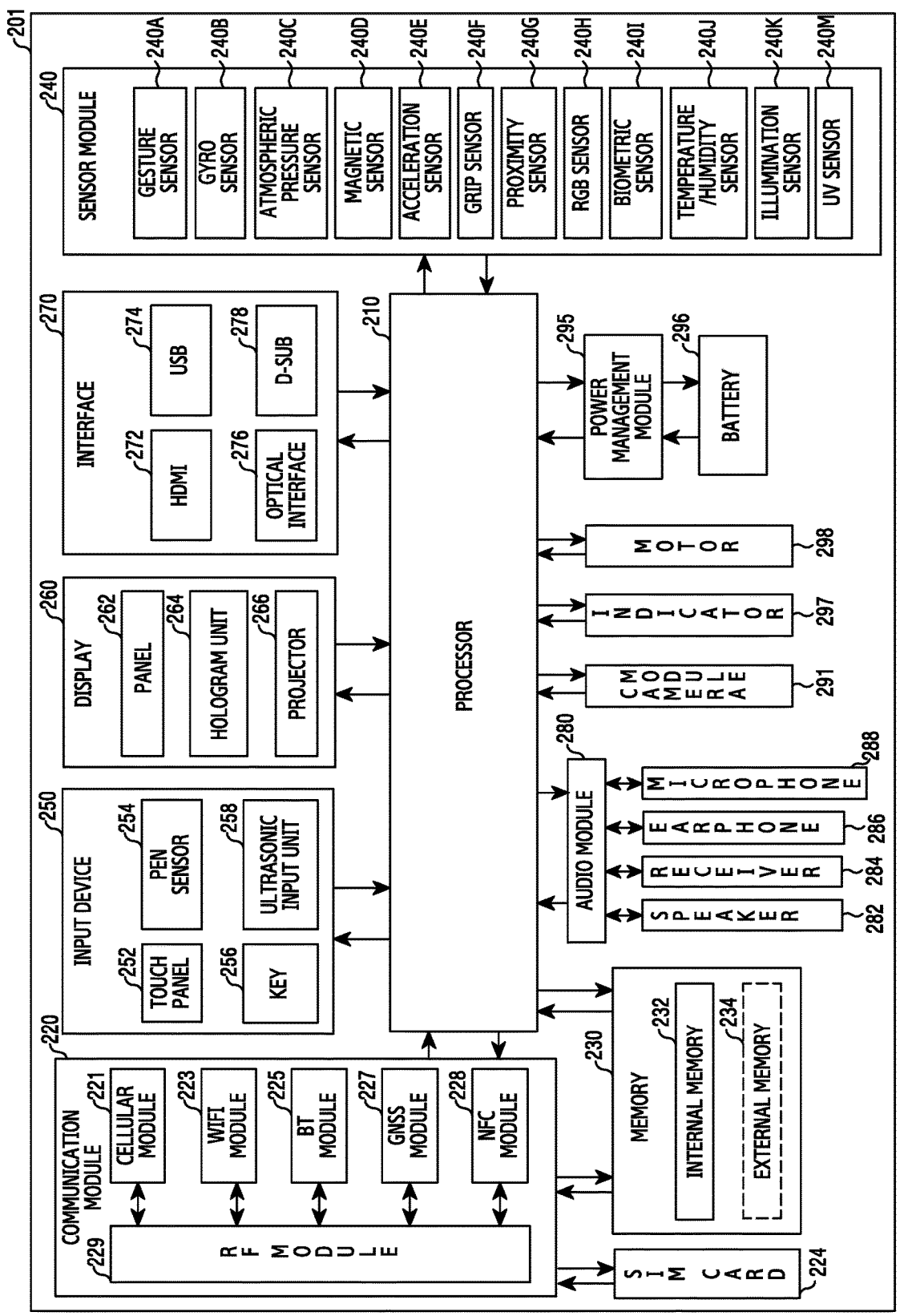
FIG. 2 is a block diagram of an electronic device according to embodiments of the present disclosure.

FIG. 2 is a block diagram of an electronic device according to an embodiment of the present disclosure.

Referring to FIG. 2, an electronic device 201 is provided which may include all or a part of the electronic device 101 illustrated in FIG. 1. The electronic device 201 may include one or more processors 210 (e.g., an AP), a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298. The electronic device 201 may have more or fewer elements than those illustrated in FIG. 2. For example, the electronic device 201 may not include some elements depending on the type thereof. The elements of the electronic device 201 may be located on the housing (or the bezel or the body) of the electronic device 201, or may be formed outside the electronic device 201.

The processor 210 may control a plurality of hardware or software components connected to the processor 210 by driving an operating system or an application program, and perform processing of various pieces of data and calculations. The processor 210 may be embodied as a system on chip (SoC). According to an embodiment of the present disclosure, the processor 210 may further include a graphic processing unit (GPU) and/or an image signal processor. The processor 210 may include at least some (e.g., a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

According to an embodiment of the present disclosure, the processor 210 may control the general operation of the electronic device 201. The processor 210 may include one or more processors. For example, the processor 210 may include a CP, an AP, an interface (e.g., general-purpose input/output (GPIO), or an internal memory, either as separate elements or integrated into one or more integrated circuits. The application processor may perform various functions for the electronic device 201 by executing several software programs, and the communication processor may perform processing and control for voice communication and data communication. The processor 210 may serve to execute a particular software module (e.g., an instruction set) stored in the memory 230 and perform various particular functions corresponding to the module.

According to an embodiment of the present disclosure, the processor 210 may control the operation of hardware modules, such as the audio module 280, the interface 270, the display 260, the camera module 291, and the communication module 220. The processor 210 may be electrically connected to the communication module 220, the display 260, and the memory 230 of the electronic device 201.

According to an embodiment of the present disclosure, the processor 210 may process steps related to authentication between electronic devices. When the electronic device acquires a user's biometric information and operates as a device that provides the biometric information to another electronic device connected through wireless communication, the processor 210 may control steps of registering, in an external device, authentication information for authenticating the external device through the electronic device, establishing a communication connection with the external device through a wireless communication unit, receiving a request for authenticating the electronic device from the external device in response to the communication connection, acquiring biometric information corresponding to a user of the electronic device using a biometric recognition module in response to the authentication request, performing device authentication for the user based on at least the biometric information, encrypting authentication information when the authentication is successfully performed, and transmitting the encrypted authentication information to the external device.

According to an embodiment of the present disclosure, when the electronic device operates as a device that receives biometric information from another electronic device connected through wireless communication, the processor 210 may control registering an external device as a companion device of the electronic device based on authentication information of the external device, establishing a communication connection with the external device through a wireless communication unit, transmitting an authentication request to the external device in response to the communication connection, receiving authentication information from the external device in response to the authentication request, identifying a signature for the received authentication information, and processing authentication of the electronic device through the external device when the signature of the authentication information is identified.

According to an embodiment of the present disclosure, the processor 210 may provide an execution environment which includes a secure world and a normal world and in which a normal application (function) operates in the normal world and an application (function) required to be secured safely operates in the secure world. For example, the processor 210 may include a secure area (e.g., TrustZone). A processing (or control) operation of the processor 210 depending on the role of the electronic device will be described in detail with reference to the accompanying drawings.

The communication module 220 includes a cellular module 221, a Wi-Fi module 223, a Bluetooth module 225, a GNSS module 227, an NFC module 228, and a radio frequency (RF) module 229. Although not shown, the communication module 220 may further include, for example, a WiGig module, a LiFi module, or the like. According to one embodiment, the WiFi module 223 and the WiGig module may be integrated into a single chip.

The cellular module 221 may provide voice communication, video communication, a messaging service, an Internet service or the like through a communication network. According to one embodiment, the cellular module 221 may perform discrimination and authentication of the electronic device 201 within a communication network using the SIM card 224. The cellular module 221 may perform at least a portion of functions that the processor 210 provides. The cellular module 221 may include the CP. At least a portion of the cellular module 221, the Wi-Fi module 223, the Bluetooth module 225, the GNSS module 227, and the NFC module 228 may be included within one integrated circuit (IC) or an IC package. The electronic device 201 may not include the cellular module 221.

The RF module 229 may transmit and receive a communication signal (e.g., an RF signal). The RF module 229 may include a transceiver, a power amplifier module (PAM), a frequency filter, a low noise amplifier (LNA), an antenna, or the like. According to another embodiment, at least one of the cellular module 221, the Wi-Fi module 223, the Bluetooth module 225, the GNSS module 227, or the NFC module 228 may transmit and receive an RF signal through a separate RF module.

The WiFi module 223 may indicate a module for wirelessly connecting to the Internet and forming a wireless LAN link with an external device (e.g., electronic device 102 or the server 106). The WiFi module 223 may be embedded inside or provided outside the electronic device 201. Wireless Internet technology may use WiFi, LiFi, WiGig, Wibro, world interoperability for microwave access (WiMax), high speed downlink packet access (HSDPA), or millimeter wave (mmWave). The WiFi module 223 may transmit or receive various data of the electronic device 201 to or from an external electronic device by interworking with the external device which is connected with the electronic device 201 via a network (e.g., a wireless Internet network or the network 162). The WiFi module 223 may always maintain an on state or may be turned on/off according to settings of the electronic device 201 or a user input.

The Bluetooth module 225 and the NFC module 228 may indicate short range communication modules for performing short range communication. The short range communication technology may use Bluetooth, BLE, radio frequency identification (RFID), Infrared Data Association (IrDA), ultra wideband (UWB), ZigBee, NFC, or the like. The short range communication module may transmit or receive various data of the electronic device 201 to or from an external device by interworking with the external device connected with the electronic device 201 via a network (e.g., a short range communication network). The short range communication module (e.g., the Bluetooth module 225 and the NFC module 228) may always maintain an on state or may be turned on/off according to settings of the electronic device 201 or a user input.

The SIM 224 may include a card or an embedded SIM including a subscriber identification module, and may include unique identification information (e.g., an integrated circuit card identifier (ICCID)) or subscriber information (e.g., integrated mobile subscriber identity (IMSI)).

The memory 230 includes an internal memory 232 or an external memory 234. For example, the internal memory 232 may include at least one of a volatile memory (e.g., a dynamic random access memory (DRAM), a static RAM (SRAM), or a synchronous DRAM (SDRAM)), and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD)). The external memory 234 may include a flash drive, compact flash (CF), secure digital (SD), micro secure digital (Micro-SD), mini secure digital (Mini-SD), extreme digital (xD), multimedia card (MMC), a memory stick, or the like. The external memory 234 may be functionally or physically connected to the electronic device 201 through various interfaces.

According to an embodiment of the present disclosure, when the electronic device acquires a user's biometric information and operates as a device that provides the biometric information to another electronic device connected through wireless communication, the memory 230 may store one or more programs, data, or instructions related to the operation of the processor 210 such as registering, in an external device, authentication information for authenticating the external device through the electronic device; establishing a communication connection with the external device through a wireless communication unit; receiving a request for authenticating the electronic device from the external device in response to the communication connection; acquiring biometric information corresponding to a user of the electronic device using a biometric recognition module in response to the authentication request; performing device authentication for the user based on at least the biometric information; encrypting authentication information when the authentication is successfully performed; and transmitting the encrypted authentication information to the external device.

According to an embodiment of the present disclosure, when the electronic device operates as a device that receives biometric information from another electronic device connected through wireless communication, the memory 230 may store one or more programs, data, or instructions related to the operations of the processor 210, such as registering an external device as a companion device of the electronic device based on authentication information of the external device; establishing a communication connection with the external device through a wireless communication unit; transmitting an authentication request to the external device in response to the communication connection; receiving authentication information from the external device in response to the authentication request; identifying a signature for the received authentication information; and processing authentication of the electronic device through the external device when the signature of the authentication information is identified.

The memory 230 includes an expandable memory (e.g., the external memory 234) or an internal memory 232. The electronic device 201 may also operate in relation to web storage performing a storage function of the memory 230 over the Internet.

The memory 230 stores one or more pieces of software (or software modules). For example, software components may include an operating system software module, a communication software module, a graphic software module, a user interface software module, a moving picture experts group (MPEG) module, a camera software module, or one or more application software modules (e.g., an authentication module and a biometric recognition module). Further, since the module, which is the software component, may be expressed as a set of instructions, the module may also be expressed as an instruction set. The module may also be expressed as a program. The memory 230 may include an additional module (instructions) as well as the above-described modules. Alternatively, the memory 230 may not use some modules (instructions) if unnecessary.

The operating system software module includes various software components for controlling overall system operation. Controlling overall system operation includes managing and controlling the memory, controlling and managing storage hardware (devices), and controlling and managing power. Further, the operating system software module may perform a function of smoothly supporting communication between various hardware (devices) and software components (modules).

The communication software module enables communication with another electronic device, such as a wearable device, a smart phone, a computer, a server, or a portable terminal, through the communication module 220 or the interface 270. Further, the communication software module may be formed in a protocol structure corresponding to a corresponding communication scheme.

The graphic software module includes various software components for providing and displaying graphics on the display 260. The term "graphics" may mean text, a web page, an icon, a digital image, video, an animation, and the like.

The user interface software module includes various software components related to a UI. For example, the UI software module may include content indicating how the state of the UI is changed or indicating the conditions under which the change in the state of the UI is made.

The MPEG module includes a software component which enables digital content (e.g., video and audio data) related processes and functions (e.g., generation, reproduction, distribution, and transmission of content).

The camera software module may include a camera-related software component which enables camera-related processes and functions.

The application module includes a web browser including a rendering engine, email, instant messaging, word processing, keyboard emulation, an address book, a touch list, widgets, digital rights management (DRM), iris scan, context cognition, voice recognition, position-determining function, location-based service, and the like. The application module may include an application module for performing authentication between electronic devices based on user's biometric information.

The sensor module 240 may measure a physical quantity or may detect an operation state of the electronic device 201, and may convert the measured or detected information to an electric signal. The sensor module 240 may include at least one of a gesture sensor 240A, a gyro sensor 240B, a barometer sensor 240C, a magnetic sensor 240D, an acceleration sensor 240E, a grip sensor 240F, a proximity sensor 240G, a red, green, blue (RGB) sensor 240H, a medical sensor 240I, a temperature/humidity sensor 240J, an illuminance sensor 240K, or an ultra violet (UV) sensor 240M. Additionally, the sensor module 240 may include an E-nose sensor, an electromyography sensor (EMG) sensor, an electroencephalogram (EEG) sensor, an electrocardiogram (ECG) sensor, an infrared (IR) sensor, an iris scan sensor, and/or a fingerprint scan sensor. The sensor module 240 may further include a control circuit for controlling at least one sensor included therein. The electronic device 201 may further include a processor which is a part of the processor 210 or a separate element from the processor 210 and is configured to control the sensor module 240. The processor may control the sensor module 240 while the processor 210 remains at a sleep state.

The input device 250 includes a touch panel 252, a (digital) pen sensor 254, a key 256, or an ultrasonic input device 258. The touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be a part of a touch panel or may include an additional sheet for recognition. The key 256 may include a physical button, an optical key, a keypad, and the like. The ultrasonic input device 258 may detect an ultrasonic wave, which is generated from an input tool, through a microphone 288, and may identify data corresponding to the detected ultrasonic wave. The input device 250 may include an electronic pen. The input device 250 may be implemented to receive a force touch.

The display 260 includes a panel 262, a hologram device 264, a projector 266, and/or a control circuit for controlling the aforementioned elements.

The panel 262 may be implemented to be flexible, transparent, or wearable. The panel 262 and the touch panel 252 may be integrated into one or more modules. According to one embodiment, the panel 262 may include a pressure sensor (or a force sensor) for measuring an intensity of pressure on a user's touch. The pressure sensor may be integrated into the touch panel 252 or may be implemented with one or more sensors separate from the touch panel 252.

The panel 262 may be located on the display 260 and may detect user input that contacts or approaches the surface of the display 260. The user input may include a touch event or a proximity input made based on at least one of a single touch, a multi-touch, hovering, and an air gesture. According to an embodiment of the present disclosure, the panel 262 may receive user input for initiating an operation related to the use of the electronic device 201 and generate an input signal according to the user input. The panel 262 may be configured to convert a change in pressure applied to a particular part of the display 260 or capacitance generated on a particular part of the display 260 into an electric input signal. The panel 262 may detect a location and an area on the surface of the display 260 that an input means (e.g., a user's finger or an electronic pen) touches. Further, the panel 262 may be implemented to detect even pressure of a touch (e.g., a force touch) according to the applied touch scheme.

The hologram device 264 may display a stereoscopic image in a space using a light interference phenomenon. The projector 266 may project light onto a screen so as to display an image. The screen may be arranged inside or outside the electronic device 201.

The interface 270 may include an HDMI 272, a USB 274, an optical interface 276, or a D-subminiature (D-sub) 278. Additionally, the interface 270 may include a mobile high definition link (MHL) interface, a SD card/multi-media card (MMC) interface, or an IrDA standard interface.

The interface 270 may receive data or power from another electronic device and transmit the received data or power to each element within the electronic device 201. The interface 270 may transmit data within the electronic device 201 to another electronic device. For example, the interface 270 may include a wired/wireless headset port, an external charger port, a wired/wireless data port, a memory card port, an audio input/output port, a video input/output port, an earphone port, and the like.

The audio module 280 may convert a sound and an electric signal in dual directions. At least a portion of the audio module 280 may be included in the input/output interface 145 illustrated in FIG. 1. The audio module 280 may process sound information that is inputted or outputted through a speaker 282, a receiver 284, an earphone 286, or a microphone 288. The audio module 280 may transmit an audio signal received from the processor 210 to an output device (e.g., the speaker 282, the receiver 284, or the earphone 286), and may transmit an audio signal like a voice which is received from an input device (e.g., the microphone 288) to the processor 210. The audio module 280 may convert voice/audio data into an audible sound and output the audible sound through the output device under the control of the processor 210, and may convert an audio signal like a voice received from the input device into a digital signal and transmit the digital signal to the processor 210.

The speaker 282 or the receiver 284 may output audio data which is received from the communication module 220 or stored in the memory 230. The speaker 282 or the receiver 284 may output an audio signal related to various operations (functions) performed in the electronic device 201. The microphone 288 may receive an external audio signal and may process the audio signal into electric voice data. The microphone 288 may implement various noise reduction algorithms for removing a noise occurring in the process of receiving an external audio signal. The microphone 288 may serve to input an audio streaming such as a voice command or the like.

The camera module 291 may be a device for shooting a still image or a video, and may include at least one image sensor (e.g., a front sensor or a rear sensor), a lens, an image signal processor (ISP), or a flash (e.g., an LED or a xenon lamp).

According to an embodiment of the present disclosure, the camera module 291 may be an element for supporting a photography function of the electronic device 201. The camera module 291 may photograph a certain subject under the control of the processor 210 and transmit the photographed data (e.g., an image) to the display 260 and the processor 210. The camera module 291 may include a first camera (e.g., a color (RGB) camera) for acquiring color information and a second camera (e.g., an IR camera) for acquiring depth information (e.g., location information and distance information of the subject). The first camera may be a front camera located on the front side of the electronic device 201. The front camera may be replaced with the second camera, and the first camera may not be located on the front side of the electronic device 201. The first camera may be disposed on the front side of the electronic device 201 along with the second camera. The first camera may be a back camera located on the back side of the electronic device 201. The first camera may include both the front camera and the back camera located on the front side and the back side of the electronic device 201. The camera module 291 may include an image sensor. The image sensor may be implemented as a charge-coupled device (CCD) or a complementary metal-oxide semiconductor (CMOS).

The power management module 295 may manage power of the electronic device 201. According to an embodiment of the present disclosure, the power management module 295 may include a power management integrated circuit (PMIC), a charger IC, or a battery gauge.

The PMIC may have a wired charging method and/or a wireless charging method. The wireless charging method may include a magnetic resonance method, a magnetic induction method or an electromagnetic wave method. The PMIC may further include an additional circuit for wirelessly charging a coil loop, a resonance circuit, or a rectifier, and the like. The battery gauge may measure a remaining capacity, voltage, current or temperature thereof while the battery 296 is charged. The battery 296 may include a rechargeable battery or a solar battery.

The indicator 297 may display a specific state of the electronic device 201 or a portion thereof (e.g., a processor 210), such as a booting state, a message state, a charging state, and the like. The motor 298 may convert an electrical signal into a mechanical vibration and may generate vibration, a haptic effect, and the like.

For example, the electronic device 201 may include a mobile TV supporting device (e.g., a GPU) for processing media data according to the standards of digital multimedia broadcasting (DMB), digital video broadcasting (DVB), mediaFlo™, or the like.

Each of the elements described in the present disclosure may be configured with one or more of the above-described components, and the names of the elements may be changed according to the type of electronic device. Some elements of the electronic device 201 may be omitted or other additional elements may be added. Furthermore, some of the elements may be combined with each other so as to form one entity, and the functions of the elements may be performed in the same manner as before being combined.

Figure 3:
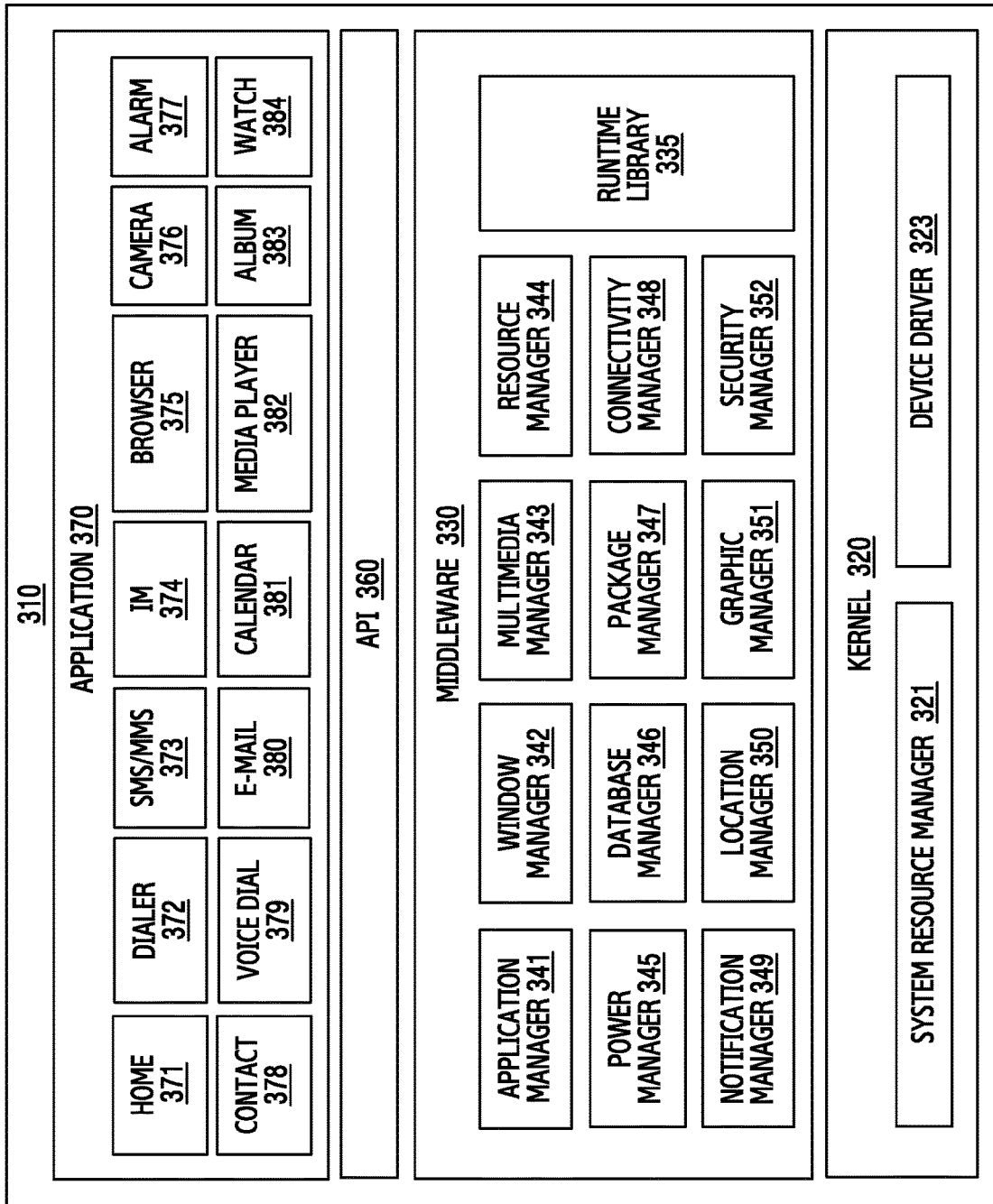
FIG. 3 is a block diagram of a program module according to embodiments of the present disclosure.

FIG. 3 is a block diagram of a program module according to an embodiment of the present disclosure.

Referring to FIG. 3, the program module 310 may include an operating system (OS) for controlling resources related to the electronic device 101 and/or the application program 147 executed in the OS. The operating system may be Android™, iOS™, Windows™, Symbian™, Tizen™, Bada™, or the like. The program module 310 includes a kernel 320, middleware 330, an API 360, and/or application 370. At least some of the program module 310 may be preloaded on an electronic device, or may be downloaded from an external electronic device (e.g., the external electronic device 102 or 104, or the server 106).

The kernel 320 includes a system resource manager 321 and/or a device driver 323. The system resource manager 321 may control, allocate, or collect system resources. The system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an inter-process communications (IPC) driver.

For example, the middleware 330 may provide a function required in common by the application 370, or may provide various functions to the application 370 through the API 360 so as to enable the application 370 to efficiently use the limited system resources in the electronic device. The middleware 330 includes a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage a life cycle of at least one application 370. The window manager 342 may manage GUI resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one application 370.

The power manager 345 may manage battery capacity, temperature, or power, and may determine or provide power information required for the operation of the electronic device based on corresponding information. According to an embodiment, the power manager 345 may operate in conjunction with a basic input/output system (BIOS).

The database manager 346 may generate, search for, and/or change a database to be used by at least one application 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user of the electronic device 101. The location manager 350 may manage location information of the electronic device 101. The graphic manager 351 may manage a graphic effect which will be provided to a user, or a user interface related to the graphic effect. The security manager 352 may provide all security functions required for system security, user authentication, or the like. When the electronic device 101 has a telephone call function, the middleware 330 may further include a telephony manager for managing a voice call function or a video call function of the electronic device 101.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 is a set of API programming functions, and may be provided with a different configuration according to an OS. For example, in the case of Android™ or iOS™, one API set may be provided for each platform. In the case of Tizen™, two or more API sets may be provided for each platform.

The application 370 includes one or more applications which may provide functions such as a home 371, a dialer 372, an SMS/MMS 373, an instant message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar), or environment information (e.g., providing atmospheric pressure, humidity, or temperature information).

The application 370 may additionally include an application providing environmental information (e.g., for providing atmospheric pressure, humidity, or temperature information), an authentication application for authenticating an electronic device, and a registration application for registering the electronic device as a companion device.

The application 370 may include an information exchange application that supports exchanging information between the electronic device 101 and an external electronic device 102 or 104. The information exchange application may include a notification relay application for transferring specific information to an external electronic device or a device management application for managing an external electronic device.

For example, the notification relay application may include a function of transferring, to the external electronic device 102 or 104, notification information generated from other applications of the electronic device 101 (e.g., an SMS/MMS application, an e-mail application, a health management application, or an environmental information application). Further, the notification relay application may receive notification information from an external electronic device and provide the received notification information to a user.

The device management application may manage (e.g., install, delete, or update) at least one function of an external electronic device 102 or 104 communicating with the electronic device 101 (e.g., a function of turning on/off the external electronic device itself (or some components) or a function of adjusting the brightness (or a resolution) of the display), applications operating in the external electronic device, and services provided by the external electronic device (e.g., a call service or a message service).

The application 370 may include an application (e.g., a health care application of a mobile medical appliance or the like) designated according to an external electronic device. The application 370 may include an application received from an external electronic device. The application 370 may include a preloaded application or a third party application that may be downloaded from a server. The names of the components of the program module 310 of the illustrated embodiment of the present disclosure may change according to the type of operating system.

According to an embodiment of the present disclosure, at least a part of the programming module 310 may be implemented in software, firmware, hardware, or a combination of two or more thereof, and may include a module, a program, a routine, a set of instructions, and/or a process for performing one or more functions.

The term "module" as used herein may represent a unit including one of hardware, software, and firmware or a combination of two or more of them. The "module" may be interchangeably used with the terms "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter. At least some of the devices (e.g., modules or functions thereof) or the method (e.g., steps) according to the present disclosure may be implemented by a command stored in a computer-readable storage medium in a programming module form. The instruction, when executed by a processor may cause the one or more processors to execute the function corresponding to the instruction. The computer readable recording medium may include a hard disk, a floppy disk, a magnetic medium (e.g., a magnetic tape), an optical storage medium (e.g., a compact disc-ROM (CD-ROM) or a DVD, and a magnetic-optic medium such as a floptical disc), an internal memory, etc. The instruction may include a code created by a compiler or a code executable by an interpreter. The module or programming module may further include at least one or more elements among the aforementioned elements, or may omit some of them, or may further include other elements. Operations performed by a module, programming module, or other elements may be executed in a sequential, parallel, repetitive, or heuristic manner. Alternatively, at least some of the operations may be executed in a different order or may be omitted, or other operations may be added.

According to an embodiment of the present disclosure, a recording medium may include a computer-readable recording medium having a program recorded therein to execute various methods described below in the processor.

According to an embodiment of the present disclosure, a method and an apparatus for connection between electronic devices using biometric information-based authentication. An apparatus and a method is disclosed for controlling connection between a first electronic device including a biometric recognition module (or a biometric sensor) and a second electronic device that does not include the biometric recognition module (or the biometric sensor) and providing information related to user authentication required by the second electronic device through the first electronic device. An apparatus and a method is disclosed for, when the first electronic device is registered as a companion device of the second electronic device and the second electronic device is authenticated through the first electronic device, simplifying a registration and authentication procedure based on biometric information and increasing security. An embodiment discloses an apparatus and a method for linking a public-key-based authentication scheme and a symmetric-key-based authentication scheme between the first electronic device and the second electronic device and performing symmetric-key authentication without exposing the symmetric key to the outside. An embodiment discloses an apparatus and a method for triggering a communication connection based on wireless communication between electronic devices and performing biometric information-based authentication.

According to an embodiment of the present disclosure, the electronic device may include all devices using one or more of various processors, such as an AP, a CP, a GPU, and a CPU. For example, the electronic device may include an information communication device, a multimedia device, a wearable device, an IoT device, or various other devices corresponding thereto. In the following description, the electronic device may be divided into a first electronic device (e.g., a smart phone) that includes a biometric recognition module for acquiring a user's biometric information and a second electronic device (e.g., a PC) that does not include the biometric recognition module and performs an authentication process based on the biometric information acquired by the first electronic device.

Figure 4:
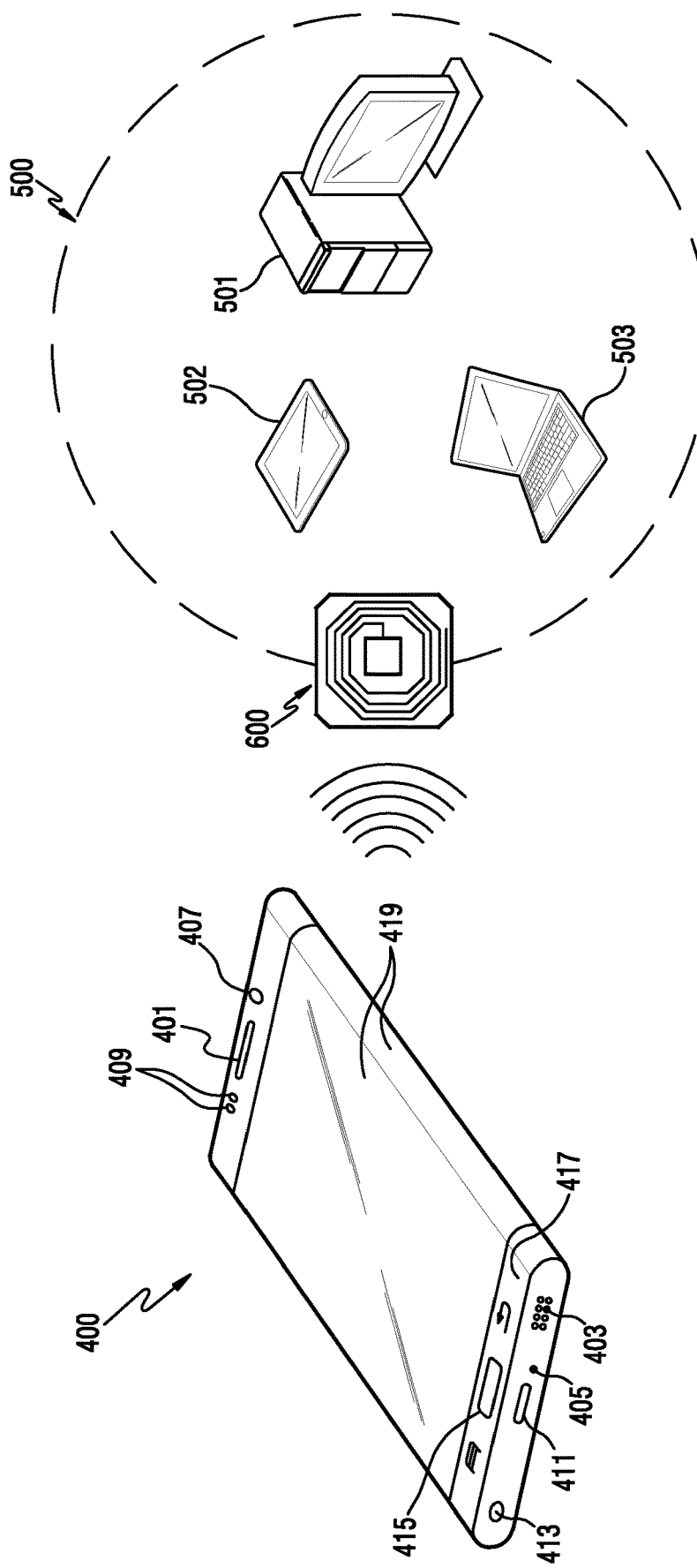
FIG. 4 illustrates a system and operation thereof according to embodiments of the present disclosure.

FIG. 4 illustrates a system and operation thereof according to embodiments of the present disclosure.

As illustrated in FIG. 4, an electronic device 400 (e.g., a first electronic device) and at least one external device 500 (e.g., a second electronic device) is provided. The external device 500 may include an NFC tag 600.

Although the NFC tag 600 is used to provide convenience of the communication connection between the electronic device 400 and the external device 500 in the example of FIG. 4, the present disclosure is not limited thereto. For example, in the communication connection between the electronic device 400 and the external device 500, the user may make the connection by directly controlling the electronic device 400 and the external device 500 (e.g., searching for a Bluetooth device, selecting a target device, or selecting connection), or the electronic device 400 and the external device 500 may be automatically connected to each other based on information about a previously established connection. In such a scheme, the configuration of the NFC tag 600 may be omitted.

Referring to FIG. 4, the electronic device 400 may include a display 419, a housing 417 (or a body) on which the display 419 is seated and coupled, and an additional device formed on the housing 417 to perform the function of the electronic device 400. The additional device may include a first speaker 401, a second speaker 403, a microphone 405, sensors (e.g., a front camera 407 and an illumination sensor 409), communication interfaces (e.g., a charging or data input/output port 411 and an audio input/output port 413), and a button 415.

According to an embodiment of the present disclosure, the electronic device 400 may include various biometric recognition modules (e.g., a fingerprint recognition sensor, an iris recognition sensor, and a voice recognition sensor) for recognizing (sensing) a user's biometric information. Biometric information may be unique and characteristic information that only the user has, and may include a fingerprint, an iris, or a voice.

According to an embodiment, the electronic device 400 may recognize a user's fingerprint through a fingerprint recognition sensor. The fingerprint recognition sensor may be included in a part of an electrical or mechanical input device of the electronic device 400. For example, the electronic device 400 may support a user's experience for various functions through one physical key by placing the fingerprint recognition sensor on the surface of the physical key (e.g., the button 415, such as a home key or a home button), which is a mechanical input device. Further, the electronic device 400 may include the fingerprint recognition sensor within a touch screen (e.g., the display 419), which is an electrical input device.

The fingerprint recognition sensor may use a swipe scheme for recognizing a fingerprint by scanning from top to bottom or bottom to top. Alternatively, the fingerprint recognition sensor may use a scheme for recognizing a fingerprint through by scanning the area that a finger touches. The fingerprint recognition may be performed in a manner such that the user touches a physical key (e.g., the button 415) or a corresponding area of the display 419 having the fingerprint recognition sensor therein with his/her finger or such that the user swipes the physical key (e.g., the button 415) or the display 419 with his/her finger.

The fingerprint recognition sensor may acquire fingerprint information (e.g., a fingerprint image), such as an ultrasonic-wave type, a heat-sensing type, a non-contact type, or a complex type through a combination thereof, as well as an optical type or a semiconductor type. The fingerprint recognition sensor may be installed in the physical key (e.g., the button 415) or the display 419, or a predetermined location in a bezel area of the electronic device 400 (e.g., the housing 417) other than the physical key (e.g., the button 415) or the display 419. Further, when the fingerprint recognition sensor is a touch-sensor-type fingerprint sensor, the fingerprint recognition sensor may be located on a lower layer of the touch screen 430.

According to an embodiment, the electronic device 400 may recognize a user's iris through an iris recognition sensor. The iris recognition sensor may analyze and informatize a user's iris characteristics (e.g., the shape or a color of the iris, and the shape of a capillary vessel) and provide information on sensing thereof to the processor. For example, the iris recognition sensor may code an iris pattern, convert the iris pattern into an image signal, and transmit the image signal to the processor, and the processor may compare and determine the iris pattern based on the received image signal.

The iris recognition sensor may include a light source module (not shown) and an infrared camera (e.g., the front camera 407) for improving a recognition rate of minute points of distinction of the iris. The light source module may be implemented as an IR LED or an LED. The light source module may output a light source to improve the iris recognition rate. For example, the pupil of the eye of the user may be expanded according to the light source output by the light source module. The IR camera may control the focus based on the expanded pupil through the IR light, image the iris to create a picture, and transmit the picture to the processor.

The electronic device 400 may be connected to the external device 500. The electronic device 400 may include, for example, a first communication circuit (e.g., an NFC module) for supporting NFC communication and a second communication circuit (such as, a WLAN module, a Wi-Fi module, or a BT module) for supporting non-NFC communication. The electronic device 400 may acquire connection information related to the connection with the external device 500 through the first communication circuit for NFC communication. The electronic device 400 may be connected to the external device 500 through the second communication circuit for non-NFC communication based on connection information. The electronic device 400 may be connected to the external device 500 based on non-NFC communication (e.g., Bluetooth, Bluetooth BLE, or Wi-Fi).

According to an embodiment, the electronic device 400 may acquire connection information (e.g., tag information) for the connection with the external device 500 from the NFC tag 600 installed in the external device 500. The electronic device 400 may determine triggering to start the communication connection with the external device 500 according to tagging of the NFC tag 600 (e.g., NFC tagging) of the external device 500. The electronic device 400 may collect tag information from the NFC tag 600 in response to the tagging of the NFC tag 600. The tag information may contain connection information based on which communication with the external device 500 can be performed. The connection information is information required by the electronic device 400 for pairing with the external device 500, and may include an address (e.g., a MAC address), a name, and a device identifier (e.g., a device ID) of the external device 500.

When the electronic device 400 is registered as a companion device of the external device 500, the electronic device 400 may perform device authentication based on a user's biometric information in response to an authentication key registration request from the external device 500. The authentication key registration request from the external device 500 may be, for example, a request process for registering a public key of public key infrastructure (PKI) of the electronic device 400 in order to register the electronic device 400 as the companion device of the external device 500.

The electronic device 400 may acquire biometric information based on the biometric recognition module (e.g., the fingerprint recognition sensor, the iris recognition sensor, or the voice recognition sensor) configured to perform user authentication. When the electronic device 400 is authenticated normally based on the acquired biometric information, the electronic device 400 may generate a user authenticator by which the PKI authentication can be performed. The electronic device 400 may store device information (e.g., a Bluetooth address or a device ID) of the external device 500 along with the generation of user authenticator. The electronic device 400 may sign the user authenticator through attestation signed by a root certificate stored in a security area (e.g., TrustZone) of the electronic device 400. The electronic device 400 may transmit the attestation signed by the root certificate and the user authenticator signed through the attestation to the external device 500. The root certificate may be an authenticator managed and issued by a root certificate authority (CA), and may include a public-key certificate or a signing certificate. For example, all authenticators may be verified by an authenticator of a higher certificate authority of the certificate authority signing the corresponding authenticator, and at this time, the authenticator of the root certificate authority may form the basis of the verification of validity of all authenticator chains. The attestation may refer to attestation used for mutual verification between the electronic device 400 and the external device 500. The user authenticator may refer to an authenticator required for verification at the time of exchanging information (e.g., biometric information) for user authentication.

The electronic device 400 may transmit authentication information (e.g., the attestation and the user authenticator) to the external device 500 through wireless communication connected to the external device 500. As the authentication information according to the authentication key registration request from the external device 500 is transmitted, the electronic device 400 may be registered as the companion device of the external device 500. The electronic device 400 may provide device information (a device ID) required for authentication of the electronic device 400 to the external device 500.

When the electronic device 400 is registered in the external device 500 as the companion device and then performs the authentication operation with the external device 500, the electronic device 400 may make the communication connection with the external device 500 through the user's control or the scheme using the NFC tag 600 as described above. For example, the electronic device 400 may be connected to the external device 500 through wireless communication and transmit device information to the external device 500. Thereafter, the electronic device 400 may receive an authentication information request from the external device 500. The electronic device 400 may acquire biometric information related to user authentication from the user in response to the authentication information request from the external device 500. The electronic device 400 may acquire user's fingerprint information through the fingerprint recognition sensor. The electronic device 400 may acquire user's iris information through the iris recognition sensor. The electronic device 400 may perform device authentication based on the acquired biometric information. When the device authentication is completed, the electronic device 400 may transmit signed authentication information to the external device 500. For example, the electronic device 400 may encrypt and sign the authentication information through a user private key stored in the electronic device 400 and transmit the authentication information to the external device 500. The authentication information transmitted from the electronic device 400 to the external device 500 may be encrypted encryption data including the acquired biometric information, or encrypted encryption data including only the authentication result, without the acquired biometric information.

An embodiment in which the electronic device 400 achieves the communication connection in conjunction with the external device 500 and provides authentication information through the communication connection will be described below in detail with reference to the accompanying drawings.

The NFC tag 600 is a device that communicates with the electronic device 400, and may perform NFC communication, which is an example of proximity communication, with the electronic device 400. Although it is assumed that the NFC tag 600 performs wireless communication with the electronic device 400, the NFC tag 600 may perform communication only in the state in which the NFC tag 600 is connected to the electronic device 400. In an embodiment, the NFC tag 600 may not be included.

The external device 500 may include various devices which can be connected to the electronic device 400 through wireless communication. For example, the external device 500 may include a desktop PC 501, a tablet PC 502, or a laptop PC 503 (e.g., a notebook). The external device 500 may have a configuration similar to that of the electronic device 400 described above. For example, the external device 500 may not include a biometric recognition module (e.g., a fingerprint recognition sensor or an iris recognition sensor) but may include a control circuit (or a processor) corresponding to the processor of the electronic device 400. The external device 500 may be implemented to have a greater or smaller number of elements than the elements of the electronic device 400 illustrated in FIG. 1 or 2. The external device 500 may have the NFC tag 600 installed in an external area of the external device 500 and may include a communication circuit (e.g., a Bluetooth module) which can be connected to the electronic device 400 through wireless (Bluetooth) communication. The external device 500 may be a device which does not include a separate biometric recognition module which cannot acquire user's biometric information (for example, fingerprint information, iris information, or voice information).

When the electronic device 400 is registered as a companion device of the external device 500, the external device 500 may make a request for registering an authentication key in the electronic device 400 connected through wireless communication. The request for registering the authentication key may be a request process for registering a public key of PKI of the electronic device 400 in the external device 500 in order to register the electronic device 400 in the external device 500 as the companion device.

Upon receiving authentication information (e.g., attestation or a user authenticator) from the electronic device 400, the external device 500 may verify the authentication information by identifying a signature thereof. For example, the external device 500 may identify the signature of the attestation based on the root certificate pre-stored in the external device 500 and identify the signature of the user authenticator based on the identified attestation. When the authentication information is verified, the external device 500 may register and manage the electronic device 400 as the companion device of the external device 500. When the authentication information is verified, the external device 500 may generate and encrypt an authentication key for the electronic device 400 and store the encrypted authentication key. The external device 500 may generate a symmetric key for symmetric-key-based authentication and store the generated symmetric key in a secure area (e.g., a TrustZone) such as a trusted platform module (TPM). The external device 500 may map and store authentication keys for public-key-based authentication and symmetric-key-based authentication. The external device 500 may map and store PKI authentication and symmetric-key authentication based on the encrypted public key, the encrypted symmetric key, device information (e.g., a Bluetooth address or a MAC address), or a device ID) of the electronic device 400, and account information of the external device 500. For example, the external device 500 may manage a mapping database (DB) as shown in the example of Table 1 below.

TABLE 1

| ID | Device ID | MAC | Account |
|---|---|---|---|
| 1 | 00001 | xx:xx:xx:xx . . . | A |
| 2 | 00002 | xx:xx:xx:xx . . . | B |
| 3 | 00003 | xx:xx:xx:xx . . . | C |
| 4 | 00004 | xx:xx:xx:xx . . . | D |
| 5 | 00005 | xx:xx:xx:xx . . . | E |
| ..... | | | |

When the external device 500 performs the authentication operation with the electronic device 400 registered as the companion device, the external device 500 may make the communication connection through the user's control or the scheme using the NFC tag 600 as described above. For example, the external device 500 may establish wireless communication in response to a connection request from the electronic device 400, and when the wireless communication is established, make a request for authentication information for authentication related to the use of the external device 500 to the electronic device 400. The external device 500 may receive signed authentication information corresponding to the request for authentication information from the electronic device 400 and determine whether the authentication information is valid. For example, the external device 500 may verify the received authentication information (e.g., identify a signature of the authentication information) based on the user authenticator stored in the external device 500. When the received authentication information is valid, the external device 500 may process the corresponding operation related to the use of the external device 500. When the external device 500 is booted in a locked state, the external device 500 may perform a login operation based on user information. The external device 500 may perform an operation of inputting authentication information received in a state of being used, such as a state in which it is required to input user information in a website while accessing the website, as information required in the state of being used.

An embodiment of the present disclosure in which the external device 500 makes the communication connection in conjunction with the electronic device 400 and operates based on user information received through the communication connection will be described below in detail with reference to the accompanying drawings.

Figure 5:
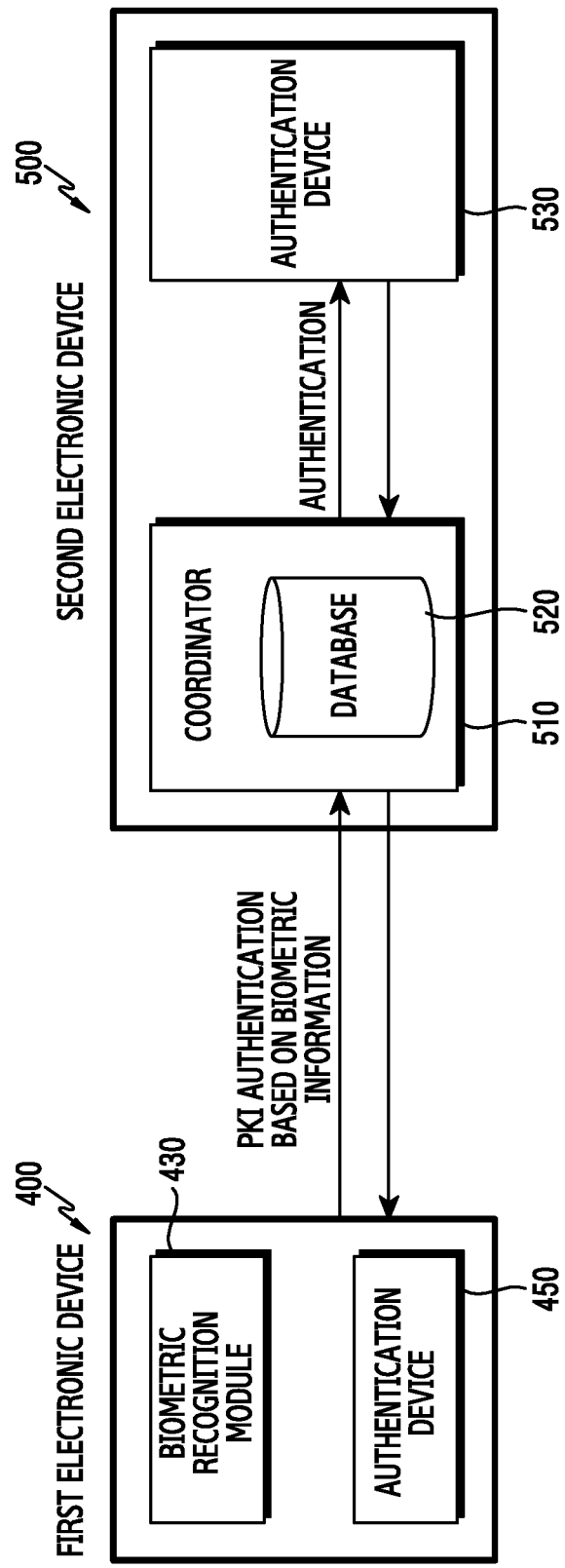
FIG. 5 illustrates an example of the configuration related to authentication processing by the electronic device according to embodiments of the present disclosure.

FIG. 5 illustrates an example of the configuration related to authentication processing by the electronic device according to various embodiments of the present disclosure.

Referring to FIG. 5, the first electronic device 400 of FIG. 4 may include a biometric recognition module 430 and an authentication device 450 in connection with authentication processing between electronic devices. The second electronic device 500 of FIG. 4 may include a coordinator 510 and an authentication device 530 in connection with authentication processing between electronic devices.

The first electronic device 400 may be a device that provides authentication information based on biometric information for authentication of the second electronic device 500. The first electronic device 400 may include at least one biometric recognition module 430 that may acquire a user's biometric information. For example, the biometric recognition module 430 may include at least one of a fingerprint recognition sensor, an iris recognition sensor, and a voice recognition sensor. The first electronic device 400 may include the authentication device 450 that may perform encryption and authentication for biometric information. The authentication device 450 of the first electronic device 400 may be a PKI authentication device which may process authentication of public-key-based authentication. For example, the first electronic device 400 may perform PKI authentication based on biometric information through the PKI authentication device.

The second electronic device 500 may be a device to be authenticated through authentication information based on biometric information acquired by the first electronic device 400. The second electronic device 500 may include the authentication device 530 that may perform verification and encryption for authentication information received from the first electronic device 400. The authentication device 530 of the second electronic device 500 may be a symmetric-key-based authentication device or authenticatee that performs authentication of symmetric-key-based infrastructure. The second electronic device 500 may include the coordinator 510, which is an agent for linking authentication of symmetric-key-based infrastructure by the second electronic device 500 and authentication of public-key-based infrastructure by the first electronic device 400. The coordinator 510 may include a database 520 (e.g., a mapping table or a mapping database) for authentication of symmetric-key-based infrastructure and authentication of public-key-based infrastructure based on device information (e.g., a Bluetooth address or a device ID) of the first electronic device 400 and account information of the second electronic device 500.

In order to prevent the key from being exposed during a symmetric key exchange process, the symmetric key is not shared between the first electronic device 400 and the second electronic device 500, and is used within the second electronic device 500. Further, a security protocol of public-key-based infrastructure for device authentication between the first electronic device 400 and the second electronic device 500 may be used to prevent a man-in-the middle (MITM) attack. In order to apply the security protocol of public-key-based infrastructure, an authenticator may be shared in advance between the authentication device 450 of the electronic device 400 (e.g., a PKI authenticator) and the coordinator 510 of the second electronic device 500 and stored in each of them.

Figure 6:
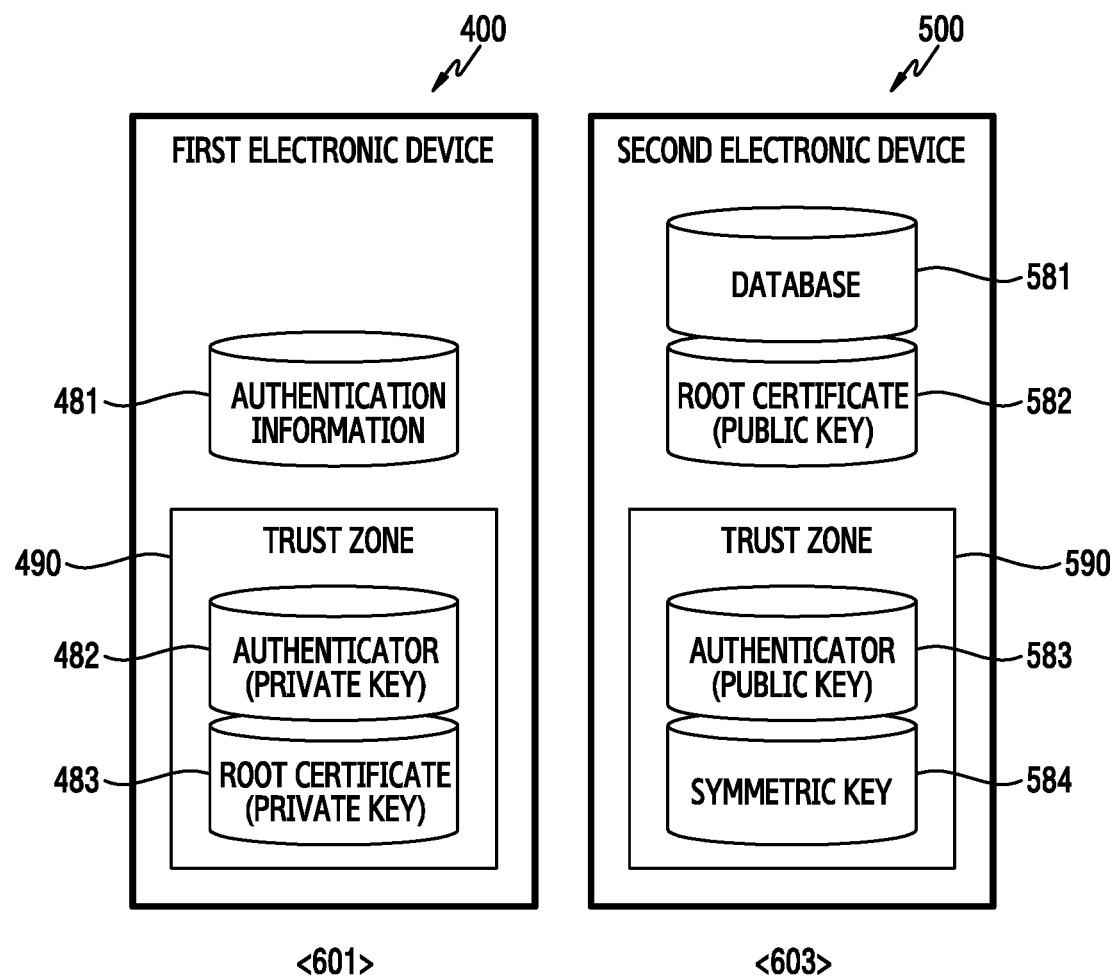
FIG. 6 illustrates an example of the data structure in the electronic device according to embodiments of the present disclosure.

The first electronic device 400 and the second electronic device 500 may register an encryption key prearranged therebetween. For example, the first electronic device 400 and the second electronic device 500 may share and store the authenticator in advance through a companion device registration process. Referring to FIG. 6, the first electronic device 400 may store an authenticator 482 based on a private key and the second electronic device 500 may store an authenticator 583 based on a public key of the first electronic device 400.

In order to link authentication of public-key-based infrastructure by the first electronic device 400 and authentication of symmetric-key-based infrastructure by the second electronic device 500, in order to share secure information between different protocols (e.g., PKI and symmetric-key-based infrastructure), the mapping table may be managed and maintained by the second electronic device 500.

Structures of data related to authentication between electronic devices are illustrated in FIG. 6 below.

FIG. 6 illustrates an example of the data structure in the electronic device according to various embodiments of the present disclosure.

Referring to FIG. 6, an example <601> may indicate an example of the basic data structure of the first electronic device 400 and an example <603> may indicate an example of the basic data structure of the second electronic device 500. The first electronic device 400 and the second electronic device 500 may include a secure area (e.g., TrustZone 490 or 590) in which information required for authentication between the electronic devices can be safely stored.

The first electronic device 400 may include PKI information 481, a private-key-based user authenticator 482, and a private-key-based root certificate 483. The first electronic device 400 may configure the private-key-based user authenticator 482 and the private-key-based root certificate 483 in the TrustZone 490.

The second electronic device 500 may include a database 581 (containing mapping data of PKI and symmetric-key-based infrastructure), a public-key-based root certificate 582, a public-key-based user authenticator 583, and a symmetric key 584. The second electronic device 500 may configure the public-key-based user authenticator 583 and the symmetric key 584 in the TrustZone 590.

The root certificate may be an authenticator issued by a root CA and may include a public-key certificate or a signing certificate. The attestation may be an authenticator used for mutual verification between the first electronic device 400 and the second electronic device 500. The user authenticator may be an authenticator required for verification at the time of exchanging biometric information for user authentication.

Detailed examples in which the first electronic device 400 and the second electronic device 500 make the communication connection in conjunction with each other, provide authentication information based on biometric information through the communication connection, and verify the authentication information to perform related operations will be described below with reference to the accompanying drawings.

As described above, the electronic device of the present disclosure includes a wireless communication unit configured to perform wireless communication with an external device; a biometric recognition module; a memory; and a processor functionally connected to the wireless communication unit, the biometric recognition module, and the memory, wherein the processor is configured to register, in the external device, authentication information for authenticating the external device through the electronic device, establish a communication connection with the external device through the wireless communication unit, receive a request for authenticating the electronic device from the external device in response to the communication connection, acquire biometric information corresponding to a user of the electronic device through the biometric recognition module in response to the authentication request, perform device authentication for the user based on at least the biometric information, encrypt authentication information when the authentication is successfully performed, and transmit the encrypted authentication information to the external device.

The processor is further configured to receive a PKI registration request from the external device when the authentication information is registered in the external device.

The processor is further configured to receive a PKI authentication request from the external device.

The processor is further configured to sign the authentication information through a user private key of the electronic device.

As described above, the electronic device of the present disclosure includes a wireless communication unit configured to perform wireless communication with an external device; a memory; and a processor functionally connected to the wireless communication unit and the memory, wherein the processor is configured to register the external device as a companion device of the electronic device based on authentication information of the external device, establish a communication connection with the external device through the wireless communication unit, transmit an authentication request to the external device in response to the communication connection, receive authentication information from the external device in response to the authentication request, identify a signature for the received authentication information, and process authentication of the electronic device through the external device when the signature of the authentication information is identified.

The processor is further configured to make a request for registering PKI in the external device in response to a symmetric registration request corresponding to the external device.

The processor is further configured to receive authentication information including attestation and a user authenticator from the external device in response to the PKI registration request, identify a signature of the attestation based on a root certificate stored in the electronic device in response to the reception of the authentication information, and identify a signature of the user authenticator based on the identified attestation.

The processor is further configured to generate and store a symmetric key for symmetric-key authentication of the external device based on the identification of the signature of the authentication information and map and store PKI authentication and symmetric-key authentication in order to link a PKI authentication scheme and a symmetric-key authentication scheme for the external device, and the symmetric key for the symmetric-key-based authentication scheme is configured not to be exposed to the external device.

The processor is further configured to make a request for PKI authentication to the external device in response to a symmetric-key authentication request corresponding to the external device.

The processor is further configured to identify the signature of the authentication information based on a public key when the authentication information is received from the external device.

A method will now be described with reference to the accompanying drawings. Embodiments of the present disclosure are not restricted or limited by the following description. Embodiments of the present disclosure will be described based on an approach of hardware. The present disclosure includes technology that uses both hardware and software and thus, does not exclude the perspective of software.

Figure 7:
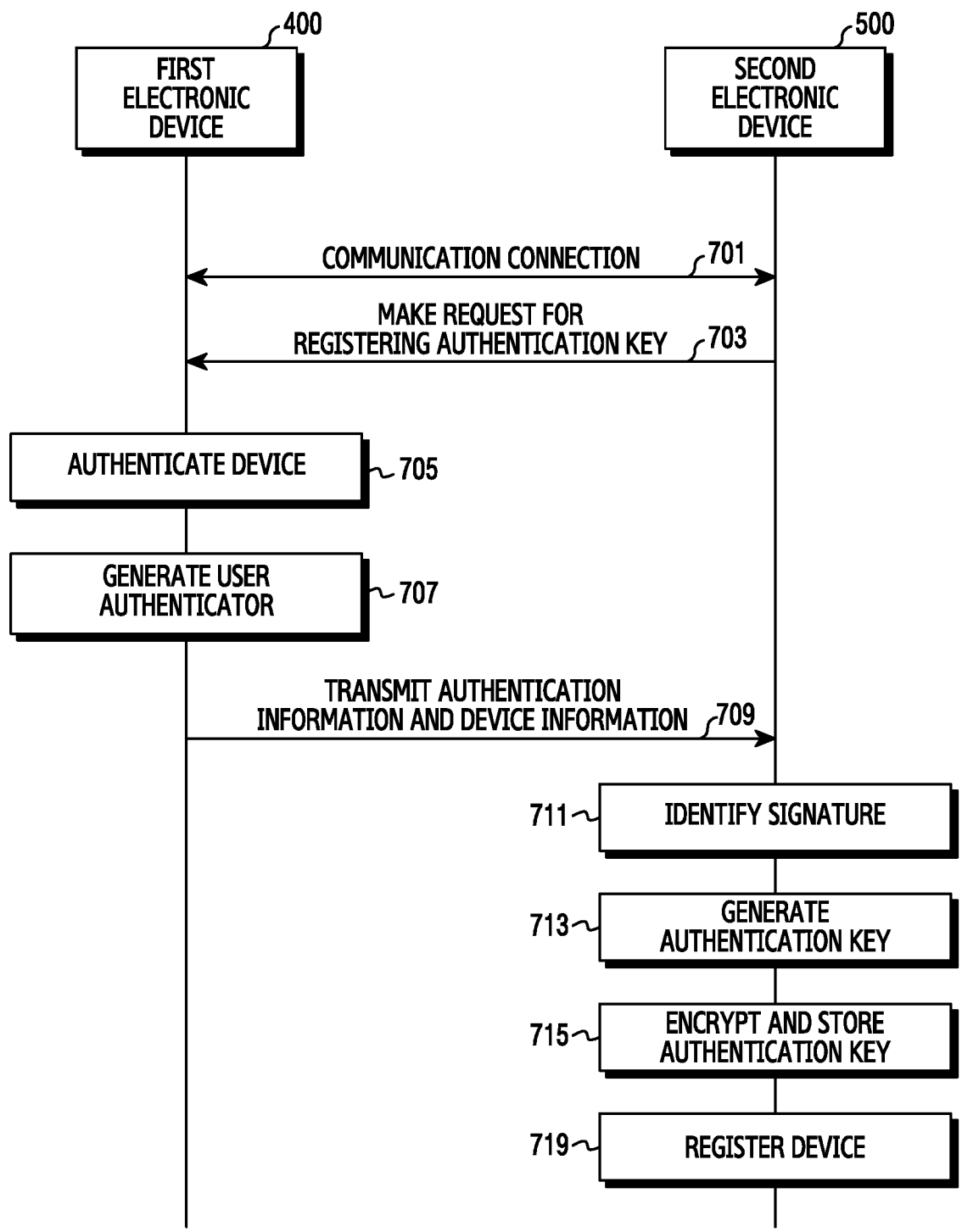
FIG. 7 illustrates a process of registering an electronic device as a companion device according to embodiments of the present disclosure.

FIG. 7 illustrates a process of registering an electronic device as a companion device.

Referring to FIG. 7, in step 701, the first electronic device 400 and the second electronic device 500 may make a communication connection. The first electronic device 400 may make a wireless communication connection with the second electronic device 500 in response to NFC tagging as shown in the example of FIG. 4. For example, the first electronic device 400 may acquire tag information from the NFC tag 600 according to the NFC tagging and extract connection information related to the communication connection with the second electronic device 500 from the acquired tag information. The first electronic device 400 may attempt the communication connection with the second electronic device 500 based on the connection information.

The connection information may correspond to information required for pairing with the second electronic device 500 and may include a Bluetooth device (e.g., the second electronic device 500) address (e.g., MAC address) and a Bluetooth device name. When receiving a communication connection request from the first electronic device 400, the second electronic device 500 may accept the communication connection in response to the communication connection request. The first electronic device 400 and the second electronic device 500 may establish Bluetooth communication therebetween.

In step 703, the second electronic device 500 may transmit an authentication key registration request to the communication-connected first electronic device 400. The second electronic device 500 may detect user input for registering the first electronic device 400 as a companion device and transmit the authentication key registration request to the communication-connected first electronic device 400 in response to the user input. The authentication key registration request may be a request for providing authentication information of PKI of the first electronic device 400 in order to register the first electronic device 400 in the second electronic device 500 as the companion device. When the authentication key registration request is made, the second electronic device 500 may provide device information of the second electronic device 500 to the first electronic device 400. When the NFC tag 600 is used, the device information of the second electronic device 500 may be inserted into the connection information when the NFC tagging is performed, and may be provided to the first electronic device 400.

In step 705, upon receiving the authentication key registration request from the second electronic device 500, the first electronic device 400 may perform device authentication for the first electronic device 400. Upon receiving the authentication key registration request from the second electronic device 500, the first electronic device 400 may display an interface (e.g., a GUI or a UI) related to the device authentication (or user authentication). The first electronic device 400 may output an interface related to acquisition of user's fingerprint information and wait for fingerprint input by the user. The first electronic device 400 may output an interface related to acquisition of user's iris information and wait for iris input by the user. The first electronic device 400 may acquire user's biometric information and perform device authentication based on the acquired biometric information. The first electronic device 400 may scan a user's fingerprint through a fingerprint recognition sensor and perform user authentication based on the scanned image. The first electronic device 400 may scan the user's iris through an iris recognition sensor and perform user authentication based on the scanned image.

When the authentication is performed normally based on the acquired biometric information, the first electronic device 400 may generate and store the user authenticator 482 for PIK authentication in step 707. The first electronic device 400 may store device information of the external device 500 (e.g., a Bluetooth address or a device ID thereof) at the time of generation of the user authenticator. The first electronic device 400 may sign the user authenticator 482 through attestation signed by the root certificate 483 stored in the security area (e.g., TrustZone 490) of the first electronic device 400. The first electronic device 400 may generate the signed attestation and the signed user authenticator as authentication information. The root certificate may be an authenticator managed and issued by the root CA and may include a public-key certificate or a signing certificate. The attestation may indicate an authenticator used for mutual verification between the first electronic device 400 and the second electronic device 500. The user authenticator may be an authenticator required for verification at the time of exchange of biometric information for user authentication.

In step 709, the first electronic device 400 may transmit the authentication information to the second electronic device 500. For example, the first electronic device 400 may transmit the authentication information including the attestation signed by the root certificate 483 and the user authenticator signed by the attestation to the second electronic device 500. The first electronic device 400 may transmit the authentication information (e.g., the signed attestation and the signed user authenticator) to the second electronic device 500 through wireless communication connected with the second electronic device 500. The first electronic device 400 may provide device information required for authentication of the first electronic device 400 through the second electronic device 500 to the second electronic device 500.

When the authentication information is received from the first electronic device 400, the second electronic device 500 may identify the signature of the received authentication information to verify the authentication information in step 711. The second electronic device 500 may identify the signature of the attestation based on the root certificate 582 pre-stored in the second electronic device 500 and identify the signature of the user authenticator based on the identified attestation.

When the signature of the authentication information is identified, the second electronic device 500 may generate an authentication key (e.g., a symmetric key) based on the authentication information of the first electronic device 400 in step 713. The authentication key may be a symmetric key of symmetric-key-based infrastructure.

In step 715, the second electronic device 500 may encrypt the authentication key and store the encrypted authentication key in the secure area. The second electronic device 500 may generate a symmetric key for authentication between the first electronic device 400 and the second electronic device 500, encrypt the generated symmetric key, and store the encrypted symmetric key in the Trust Zone 590 such as the TPM.

In step 717, the second electronic device 500 may register and manage the first electronic device 400 as the companion device. The second electronic device 500 may map and store public-key-based infrastructure by the first electronic device 400 and symmetric-key-based infrastructure by the second electronic device 500 based on the device information (e.g., a Bluetooth address and device ID) of the first electronic device 400 and the account information of the second electronic device 500. For example, the second electronic device 500 may map a public key corresponding to a private key of the first electronic device 400 and a symmetric key corresponding to the public key, map the device information of the first electronic device 400 to mapping information, and store the mapped information in the database 581. Accordingly, the second electronic device 500 may register and manage the first electronic device 400 as a companion device that can perform authentication of the second electronic device 500.

The first electronic device 400 and the second electronic device 500 may register an encryption key prearranged therebetween, so that the first electronic device 400 may be operated and recognized as a companion device. For example, the first electronic device 400 may store a private key of public-key-based infrastructure, and the second electronic device 500 may store a public key of the first electronic device 400 corresponding to the private key of public-key-based infrastructure as a symmetric key of symmetric-key-based infrastructure.

Figure 8:
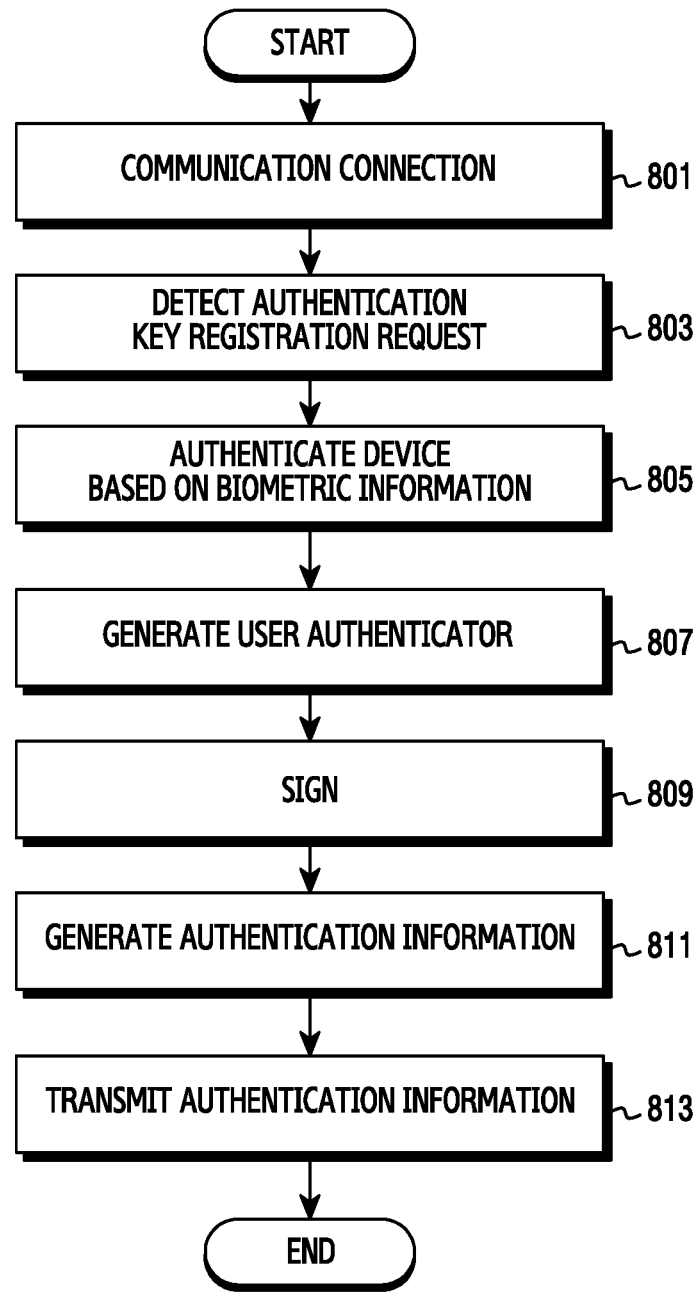
FIG. 8 is a flowchart illustrating the method of registering the electronic device as a companion device of the external device according to embodiments of the present disclosure.

FIG. 8 is a flowchart illustrating the method of registering the electronic device as a companion device of the external device according to embodiments of the present disclosure.

In FIG. 8, the electronic device indicates the first electronic device 400 that includes a biometric recognition module and is registered as a companion device for providing authentication information to the external device, and the external device indicates the second electronic device 500 that does not include a biometric recognition module and registers the electronic device as the companion device of the external device. For example, FIG. 8 illustrates an example of a process in which the first electronic device 400 provides information for registration as the companion device of the second electronic device 500.

Referring to FIG. 8, in step 801, the processor 120 or 210 of FIG. 1 or 2, may be communication-connected with the external device 500.

In step 803, the processor 210 may receive an authentication key registration request from the communication-connected external device.

When receiving the authentication key registration request from the external device, the processor 210 may perform device authentication based on biometric information in step 805. When receiving the authentication key registration request from the external device, the processor 210 may display a relevant GUI or UI) for device authentication (or user authentication). The first electronic device 400 may output a relevant interface for acquiring user's fingerprint information or iris information. The processor 210 may acquire user's biometric information and authenticate the acquired biometric information.

When the authentication is performed normally based on the acquired biometric information, the processor 210 may generate and store a user authenticator for performing PKI authentication in step 807.

In step 809, the processor 210 may sign the user authenticator. The processor 210 may sign the user authenticator based on attestation signed by a root certificate stored in the TrustZone 490. The root certificate may be an authenticator managed and issued by a root CA and may include a public certificate or a signing certificate. The attestation may be an authenticator used for mutual verification between the first electronic device 400 and the second electronic device 500. The user authenticator may be an authenticator required for verification at the time of exchange of biometric information for user authentication.

In step 811, the processor 210 may generate the signed attestation and the signed user authenticator as authentication information.

In step 813, the processor 210 may transmit the authentication information to the external device. For example, the processor 210 may transmit the authentication information including the attestation signed by the root certificate and the user authenticator signed by the attestation to the external device. The processor 210 may transmit the authentication information (e.g., the signed attestation and the signed user authenticator) to the external device through wireless communication with the external device. The processor 210 may provide device information required for authentication of the electronic device 400 through the external device to the external device. The processor 210 may encrypt and sign the authentication information through a user private key stored in the electronic device 400 and transmit the encrypted authentication information to the external device. The authentication information that the processor 210 transmits to the external device may be encrypted encryption data including acquired biometric information (e.g., fingerprint information, iris information, or voice information) or encrypted encryption data including only the authentication result without the acquired biometric information.

Figure 9:
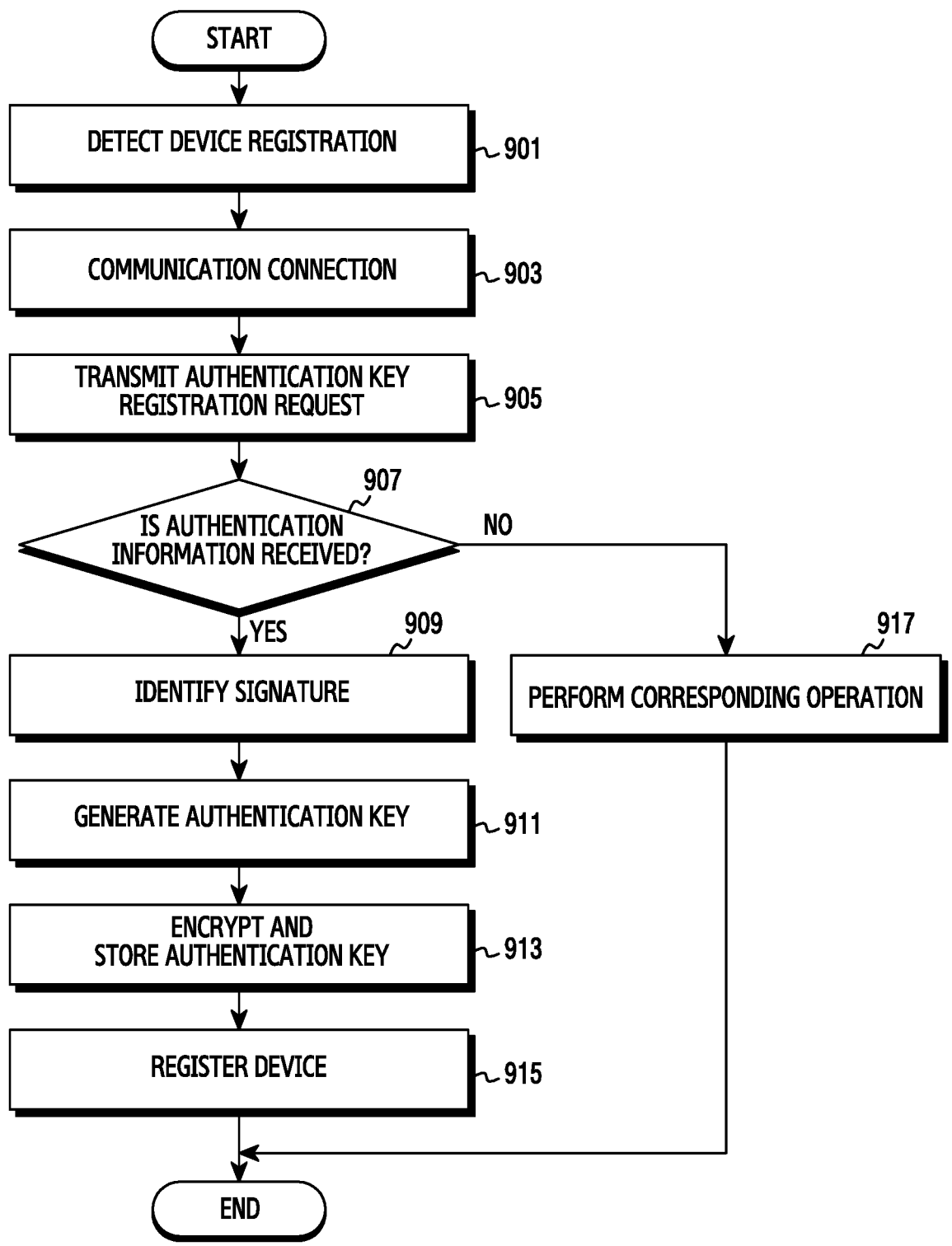
FIG. 9 is a flowchart illustrating the method of registering the external device as a companion device of the electronic device according to embodiments of the present disclosure.

FIG. 9 is a flowchart illustrating the method of registering the external device as a companion device of the electronic device.

In FIG. 9, the electronic device is the second electronic device 500, which does not include a biometric recognition module and registers the external device as a companion device of the electronic device, and the external device is the first electronic device 400, which includes a biometric recognition module and is registered as the companion device for providing authentication information to the electronic device. For example, FIG. 9 illustrates an example of a process in which the second electronic device 500 registers the first electronic device 400 as the companion device.

Referring to FIG. 9, in step 901, the processor 210 may detect device registration. The processor 210 may detect user input for registering the external device as the companion device.

In step 903, the processor 210 may establish a communication connection with the external device in response to the user input for device registration. The processor 210 may determine whether there is a communication-connected external device, and, when there is no communication-connected external device, performs a process for communication connection with the external device. The processor 210 may receive a communication connection request from the external device, accept the communication connection of the external device in response to the communication connection request, and establish the communication connection with the external device. When the processor 210 is already in a state of being connected for communication with the external device, the processor 210 may directly proceed to step 905 and perform the following steps without step 903.

When communication connection with the external device is established, the processor 210 may transmit an authentication key registration request to the external device in step 905. The authentication key registration request may be a request for providing authentication information of PKI of the external device in order to register the external device in the electronic device 500 as the companion device. When the authentication key registration request is made, the processor 210 may provide device information of the electronic device 500 to the external device. When the NFC tag 600 is used, the device information of the electronic device 500 may be inserted into connection information when NFC tagging is performed and provided to the external device.

In step 907, the processor 210 may determine whether authentication information is received from the external device.

When there is no reception of authentication information from the external device in step 907 (No of step 907), the processor 210 may process the corresponding step in step 917. The processor 210 may wait to receive the authentication information for a set predetermined time, and when the predetermined time has passed, end the device registration procedure. The processor 210 may periodically transmit the authentication key registration request to the communication-connected external device by a predetermined number of times (or for a predetermined time) when the predetermined time has passed. When there is no reception of authentication information from the external device, the processor 210 may provide the user with a guide (e.g., a popup) that prompts for identification of the state of the external device.

When authentication information (e.g., a signed attestation and signed user authenticator) is received from the external device in step 907 (Yes of step 907), the processor 210 may identify a signature for the received authentication information to verify the authentication information in step 909. The processor 210 may identify the signature of the attestation based on a root certificate pre-stored in the electronic device 500 and identify the signature of the user authenticator based on the identified attestation. The root certificate may indicate an authenticator issued by a root CA and may include, for example, a public-key certificate or a signing certificate. The attestation may indicate an authenticator used for mutual verification between the electronic device 500 and the external device. The user authenticator may be an authenticator required for verification at the time for exchanging biometric information for user authentication. The processor 210 may receive device information required for authentication of the external device along with the authentication information from the external device.

When the signature of the authentication information is identified, the processor 210 may generate an authentication key (e.g., a symmetric key) based on the authentication information in step 911. The authentication key may be a symmetric key of symmetric-key-based infrastructure.

In step 913, the processor 210 may encrypt the authentication key and store the encrypted authentication key in the secure area. The processor 210 may generate a symmetric key for authentication between the electronic device 500 and the external device, encrypt the generated symmetric key, and store the encrypted symmetric key such as the TPM in the TrustZone 590.

In step 915, the processor 210 may register and manage the external device as the companion device. The processor 210 may map and store public-key-based infrastructure by the external device and symmetric-key-based infrastructure by the electronic device 500 based on device information (e.g., a Bluetooth address and a device ID) of the external device and account information of the electronic device 500. For example, the processor 210 may map a public key corresponding to a private key of the external device and a symmetric key corresponding to the public key, map the device information of the external device to mapping information, and store the mapped information in the database 581. Accordingly, the processor 210 may register and manage the external device as the companion device for performing authentication of the electronic device 500.

Figure 10:
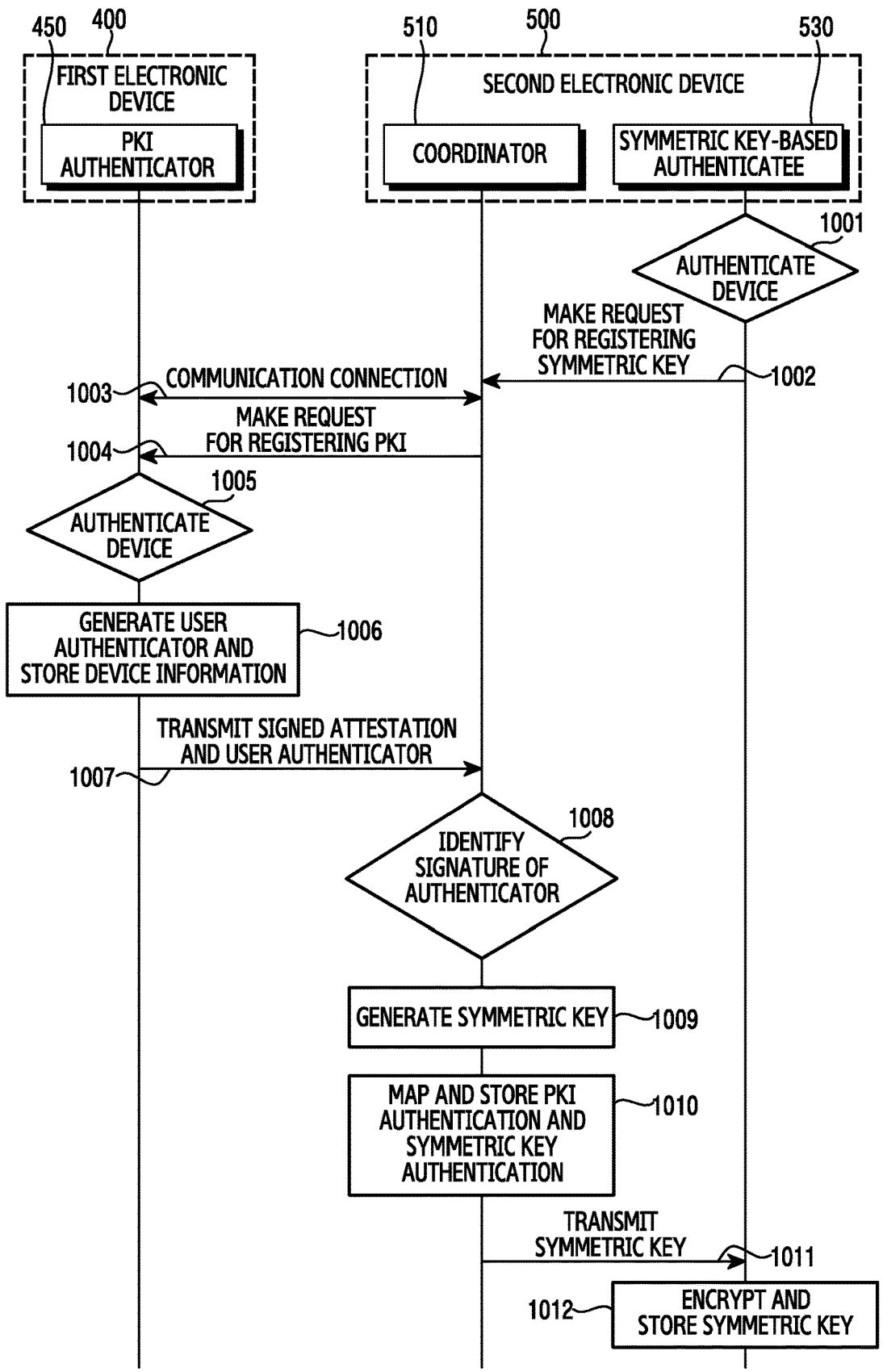
FIG. 10 illustrates a device registration process between electronic devices according to embodiments of the present disclosure.

FIG. 10 illustrates a device registration process between electronic devices.

As illustrated in FIG. 10, a system includes the first electronic device 400, which includes a biometric recognition module, and a second electronic device 500, which does not include a biometric recognition module. The first electronic device 400 may include the PKI authenticator 450 in connection with authentication processing between electronic devices. The second electronic device 500 may include the coordinator 510 and the SKI authenticatee 530 in association with authentication processing between electronic devices.

Referring to FIG. 10, in step 1001, the SKI authenticatee 530 of the second electronic device 500 may process a device authentication operation. The SKI authenticatee 530 may detect user input for making a request for registering the first electronic device 400 as a companion device for performing authentication of the second electronic device 500 on behalf of the second electronic device 500. The SKI authenticatee 530 may display a relevant GUI or UI for device or user authentication of the second electronic device 500 in response to the user input. For example, the SKI authenticatee 530 may display an interface for inputting a password (e.g., a PIN) and perform device authentication based on the input password.

When the device authentication is performed normally, the SKI authenticatee 530 may transmit a symmetric key registration request to the coordinator 510 in step 1002.

In step 1003, the coordinator 510 of the second electronic device 500 may make the communication connection for communication with the first electronic device 400 in response to the symmetric key registration request of the SKI authenticatee 530. The coordinator 510 may functionally be connected for communication with the PKI authenticator 450 of the first electronic device 400.

In step 1004, the coordinator 510 of the second electronic device 500 may transmit a PKI (e.g., a public key of the first electronic device 400) registration request to the communication-connected first electronic device 400. When receiving the PKI registration request from the second electronic device 500 through wireless communication, the first electronic device 400 may transmit the received PKI registration request to the PKI authenticator 450. The PKI registration request may be a request for providing authentication information (e.g., the public key) of PKI of the first electronic device 400 in order to register the first electronic device 400 in the second electronic device 500 as the companion device. When the PKI registration request is made, the coordinator 510 may provide device information of the second electronic device 500 to the first electronic device 400.

When receiving the PKI registration request, the PKI authenticator 450 of the first electronic device 400 may perform device authentication for the first electronic device 400 in step 1005. When receiving the PKI registration request, the PKI authenticator 450 may display a relevant GUI or UI for device or user authentication. The PKI authenticator 450 may acquire user's biometric information and perform device authentication based on the acquired biometric information.

When the device authentication is performed normally based on the biometric information, the PKI authenticator 450 of the first electronic device 400 may generate and store a user authenticator for performing PKI authentication in step 1006. The PKI authenticator 450 may store device information (e.g., a Bluetooth address or a device ID) of the second electronic device 500 along with the generation of the user authenticator. The first electronic device 400 may sign the user authenticator based on attestation signed by a root certificate stored in the secure area (e.g., the TrustZone 490) of the first electronic device 400. The PKI authenticator 450 may generate signed authentication information including the attestation signed by the root certificate and the user authenticator signed by the attestation.

In step 1007, the PKI authenticator 450 of the first electronic device 400 may transmit the signed attestation and the signed user authenticator to the second electronic device 510. The PKI authenticator 450 may provide device information required for authentication of the first electronic device 400 to the second electronic device 500. The PKI authenticator 450 may transmit signed authentication information and device information of the first electronic device 400 to the second electronic device 500 through wireless communication. Upon receiving the signed authentication information through wireless communication, the second electronic device 500 may transmit the received signed authentication information to the coordinator 510.

Upon receiving the signed authentication information from the first electronic device 400, the coordinator 510 of the second electronic device 500 may identify a signature for the received signed authentication information to verify the authentication information in step 1008. The coordinator 510 may identify the signature of the attestation based on the root certificate pre-stored in the second electronic device 500 and identify the signature of the user authenticator based on the identified attestation.

When the signature of the user authenticator is identified, the coordinator 510 of the second electronic device 500 may generate a symmetric key in step 1009. The coordinator 510 may generate a key used for analyzing the encrypted biometric information by the second electronic device 500, that is, a key used for decoding the encrypted biometric information, which is the same as the symmetric key used for encrypting the biometric information of the first electronic device 400. The generated symmetric key may be stored in the TrustZone such as the TPM.

In step 1010, the coordinator 510 of the second electronic device 500 may map and store PKI authentication and symmetric-key authentication. The coordinator 510 may map and store the PKI authentication and the symmetric-key authentication based on device information of the first electronic device 400 and account information of the second electronic device 500.

In step 1011, the coordinator 510 of the second electronic device 500 may transmit the symmetric key to the SKI authenticatee 530.

In step 1012, the SKI authenticatee 530 of the second electronic device 500 may encrypt and store the symmetric key transmitted from the coordinator 510.

When the second electronic device 500 generates the symmetric key corresponding to the key used for encrypting biometric information by the first electronic device 400, the second electronic device 500 may register and manage the first electronic device 400 as the companion device used for authentication of the second electronic device 500 based on the symmetric key corresponding to the first electronic device 400. The symmetric key may be a key corresponding to the user authenticator of the first electronic device 400 (e.g., a private key), and the second electronic device 500 may register and manage the first electronic device 400 as the companion device based on the generation of the symmetric key. For example, the first electronic device 400 and the second electronic device 500 may register the symmetric key as an encryption key prearranged therebetween, so that the first electronic device 400 may be operated and recognized as the companion device. For example, the first electronic device 400 may store a private key of public-key-based infrastructure, and the second electronic device 500 may store a public key of the first electronic device 400 corresponding to the private key of public-key-based infrastructure as a symmetric key of symmetric-key-based infrastructure.

Figure 11A:
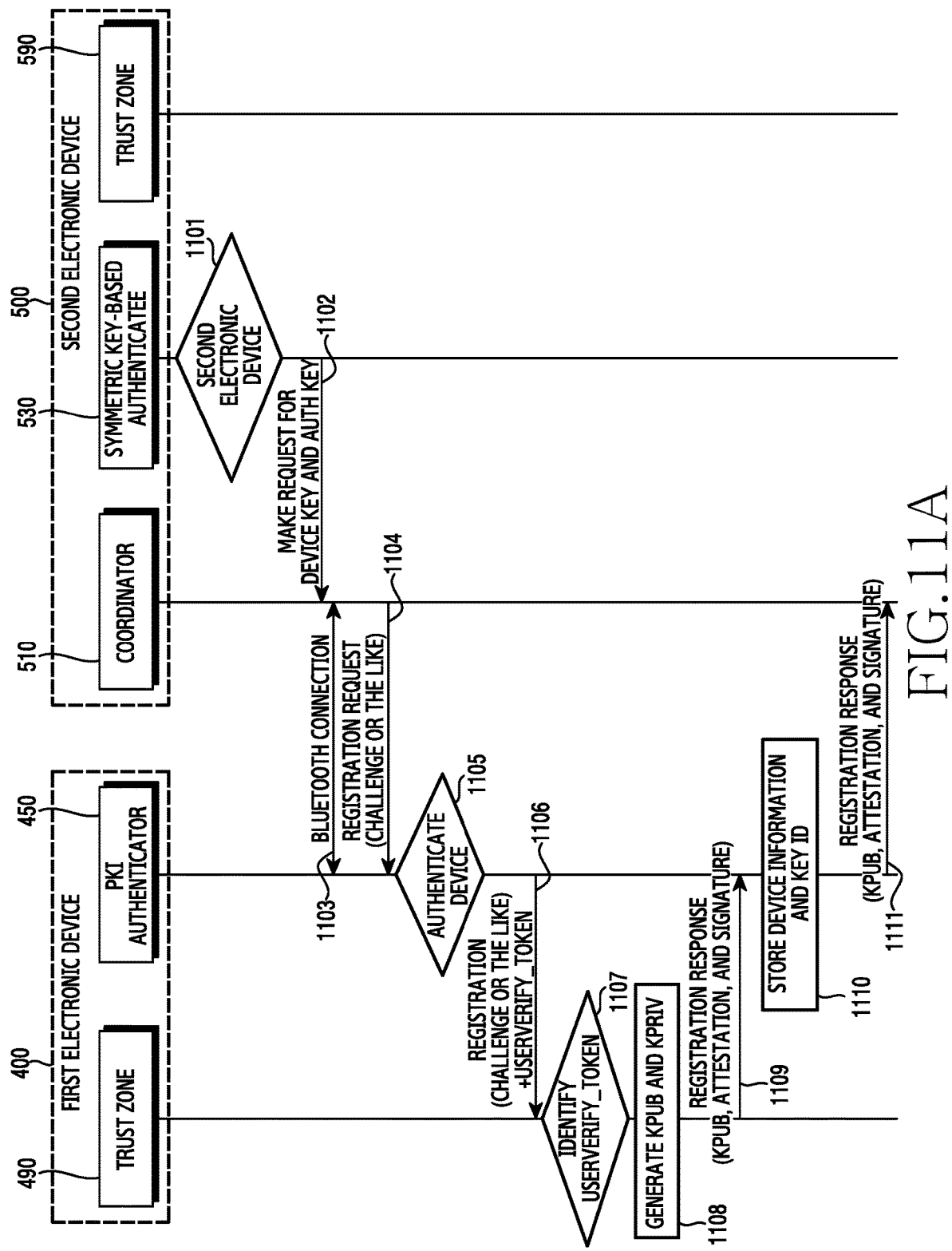
FIGS. 11A and 11B illustrate a device registration process in a system according to embodiments of the present disclosure.
Figure 11B:
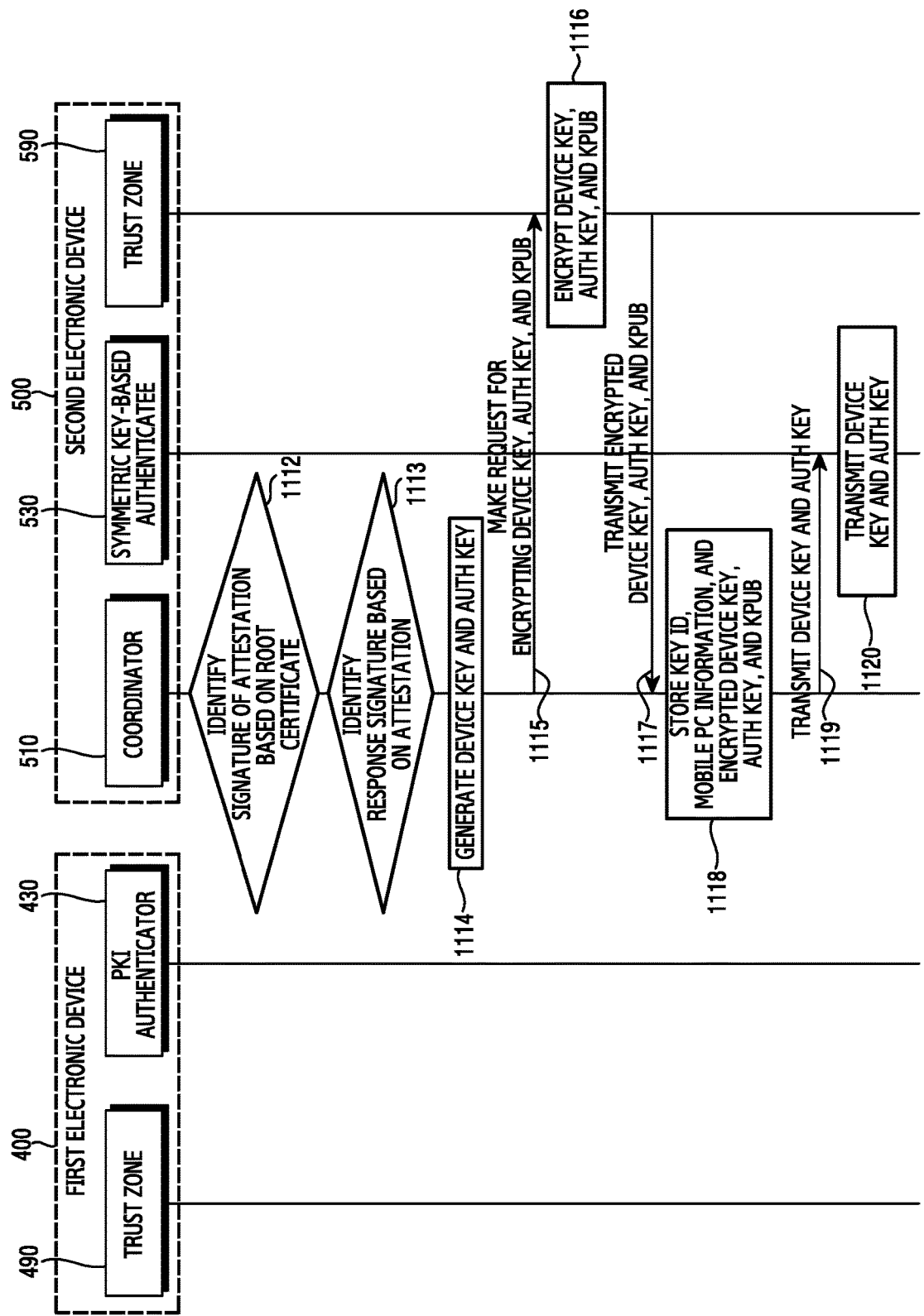

FIGS. 11A and 11B illustrate a device registration process in a system according to embodiments of the present disclosure.

As illustrated in FIGS. 11A and 11B, the system includes the first electronic device 400 including a biometric recognition module and the second electronic device 500 that does not include a biometric recognition module. The first electronic device 400 may include the PKI authenticator 450 in connection with authentication processing between electronic devices and the TrustZone 490. The second electronic device 500 may include the coordinator 510, the SKI authenticatee 530, and the TrustZone 590 in association with authentication processing between electronic devices.

Referring to FIGS. 11A and 11B, in step 1101, the SKI authenticatee 530 of the second electronic device 500 may process a device authentication operation. The SKI authenticatee 530 may detect a user input for making a request for registering the first electronic device 400 as a companion device that performs authentication of the second electronic device 500 on behalf of the second electronic device 500. The SKI authenticatee 530 may display a relevant GUI or UI for device or user authentication of the second electronic device 500 in response to the user input. For example, the SKI authenticatee 530 may display an interface for inputting a password (e.g., a PIN) and perform device authentication based on the input password.

When the device authentication is performed normally, the SKI authenticatee 530 may transmit a symmetric key registration request to the coordinator 510 in step 1102. The SKI authenticatee 530 may make a request for a first symmetric key (a device key) and a second symmetric key (an auth key) to the coordinator 510. The device key may indicate a symmetric key for authentication between the first electronic device 400 and the second electronic device 500. The auth key may indicate a symmetric key for authentication between companion device framework (CDF) services of the SKI authenticatee 530 and the second electronic device 500 (for example, a Windows PC).

In step 1103, the coordinator 510 of the second electronic device 500 may make the communication connection for communication with the first electronic device 400 in response to a symmetric key (e.g., the device key or the auth key) request of the SKI authenticatee 530. The coordinator 510 may be functionally communication-connected with the PKI authenticator 450 of the first electronic device 400. The first electronic device 400 and the second electronic device 500 may establish Bluetooth communication therebetween.

In step 1104, the coordinator 510 of the second electronic device 500 may transmit a registration request to the communication-connected first electronic device 400. The coordinator 510 may transmit the registration request including random data. The random data may include a challenge or a random number randomly generated by the second electronic device 500 for authentication between the first electronic device 400 and the second electronic device 500. When receiving the PKI registration request from the second electronic device 500 through wireless communication, the first electronic device 400 may transmit the received PKI registration request to the PKI authenticator 450. The PKI registration request may be, for example, a request for providing authentication information (e.g., the public key) of PKI of the first electronic device 400 in order to register the first electronic device 400 in the second electronic device 500 as the companion device. When the PKI registration request is made, the coordinator 510 may provide device information of the second electronic device 500 to the first electronic device 400.

Upon receiving the PKI registration request, the PKI authenticator 450 of the first electronic device 400 may perform device authentication for the first electronic device 400 in step 1105. Upon receiving the PKI registration request, the PKI authenticator 450 may display a relevant a GUI or UI for device or user authentication. The PKI authenticator 450 may acquire user's biometric information and perform device authentication based on the acquired biometric information.

When the device authentication is performed normally based on the biometric information, the PKI authenticator 450 of the first electronic device 400 may transmit the registration request to the TrustZone 490 in step 1106. When the registration request is made, the PKI authenticator 450 may transmit the random data and make a request for a user name token (userverify_token) to the TrustZone 490. The user name token may be a token which may be received in biometric information authentication.

In step 1107, the TrustZone 490 of the first electronic device 400 may identify the stored user name token.

When the user name token is identified, the TrustZone 490 of the first electronic device 400 may generate a user authenticator for performing PKI authentication in step 1108. The TrustZone 490 may generate a user public key (Kpub) and a user private key (Kpriv) for PKI authentication.

In step 1109, the TrustZone 490 of the first electronic device 400 may transmit a registration response corresponding to the registration request of the PKI authenticator 450 to the PKI authenticator 450 based on the user authenticators (e.g., Kpub and Kpriv). The TrustZone 490 may transmit the registration response including the Kpub, attestation, and signature to the PKI authenticator 450.

In step 1110, the PKI authenticator 450 of the first electronic device 400 may store device information (e.g., the Bluetooth address and the device ID) of the second electronic device 500 and a key ID. The first electronic device 400 may sign a user authenticator based on the attestation signed by the root certificate stored in the TrustZone 490 of the first electronic device 400. The PKI authenticator 450 may generate signed authentication information including the attestation signed by the root certificate and the user authenticator signed by the attestation.

In step 1111, the PKI authenticator 450 of the first electronic device 400 may transmit a registration response corresponding to the registration request of the second electronic device 500 (e.g., the coordinator 510) to the coordinator 510. The PKI authenticator 450 may transmit the registration response including the Kpub, the attestation, and the signature to the coordinator 510. For example, the PKI authenticator 450 may transmit the signed attestation and the signed user authenticator to the second electronic device 510. The PKI authenticator 450 may transmit signed authentication information and device information of the first electronic device 400 to the second electronic device 500 through wireless communication. When receiving the signed authentication information through wireless communication, the second electronic device 500 may transmit the received signed authentication information to the coordinator 510.

In steps 1112 and 1113, the coordinator 510 of the second electronic device 500 may identify the signature for the registration response upon receiving the registration response from the first electronic device 400. The coordinator 510 may identify the signature of the attestation based on the root certificate pre-stored in the second electronic device 500 in step 1112, and identify the signature of the registration response based on the identified attestation in step 1113.

When the signature of the registration response is identified, the coordinator 510 of the second electronic device 500 may generate a symmetric key in step 1114. The coordinator 510 may generate a symmetric key (e.g., a device key or an auth key) corresponding to the symmetric key (e.g., the device key or the auth key) of the SKI authenticatee 530.

In step 1115, the coordinator 510 of the second electronic device 500 may make a request for encrypting the generated symmetric key and the Kpub to the TrustZone 590. The coordinator 510 may make a request for encrypting the device key, the auth key, and the Kpub to the TrustZone 590.

In step 1116, the TrustZone 590 of the second electronic device 500 may encrypt the symmetric key and the user public key transmitted from the coordinator 510 in response to the encryption request from the coordinator 510. The TrustZone 590 may encrypt the device key, the auth key, and the Kpub.

In step 1117, the TrustZone 590 of the second electronic device 500 may transmit the encrypted symmetric key and the encrypted user public key to the coordinator 510. The TrustZone 590 may transmit the encrypted device key, auth key, and Kpub to the coordinator 510.

In step 1118, the coordinator 510 of the second electronic device 500 may store the encrypted symmetric key and user public key. The coordinator 510 may map and store the encrypted device key, the encrypted auth key, the encrypted Kpub, the key ID, the device information of the first electronic device 400, and the device information (e.g., account information) of the second electronic device 500.

In step 1119, the coordinator 510 of the second electronic device 500 may transmit the encrypted symmetric key (e.g., the device key and the auth key) to the SKI authenticatee 530. The coordinator 510 may transmit the corresponding encrypted symmetric key to the SKI authenticatee 530 in response to the request for the symmetric key from the SKI authenticatee 530.

In step 1120, the SKI authenticatee 530 of the second electronic device 500 may store the encrypted symmetric key transmitted from the coordinator 510.

When the second electronic device 500 generates the symmetric key, which is the key used for encrypting biometric information by the first electronic device 400, the second electronic device 500 may register and manage the first electronic device 400 as the companion device used for authentication of the second electronic device 500 based on the symmetric key corresponding to the first electronic device 400. The symmetric key may be a key generated based on the user authenticator (e.g., the private key) of the first electronic device 400, and the second electronic device 500 may register and manage the first electronic device 400 as the companion device based on the generation of the symmetric key. For example, the first electronic device 400 and the second electronic device 500 may register the symmetric key as an encryption key prearranged therebetween, so that the first electronic device 400 may be operated and recognized as the companion device. For example, the first electronic device 400 may store a private key of public-key-based infrastructure, and the second electronic device 500 may store a public key of the first electronic device 400 corresponding to the private key of public-key-based infrastructure as a symmetric key of symmetric-key-based infrastructure.

Figure 12:
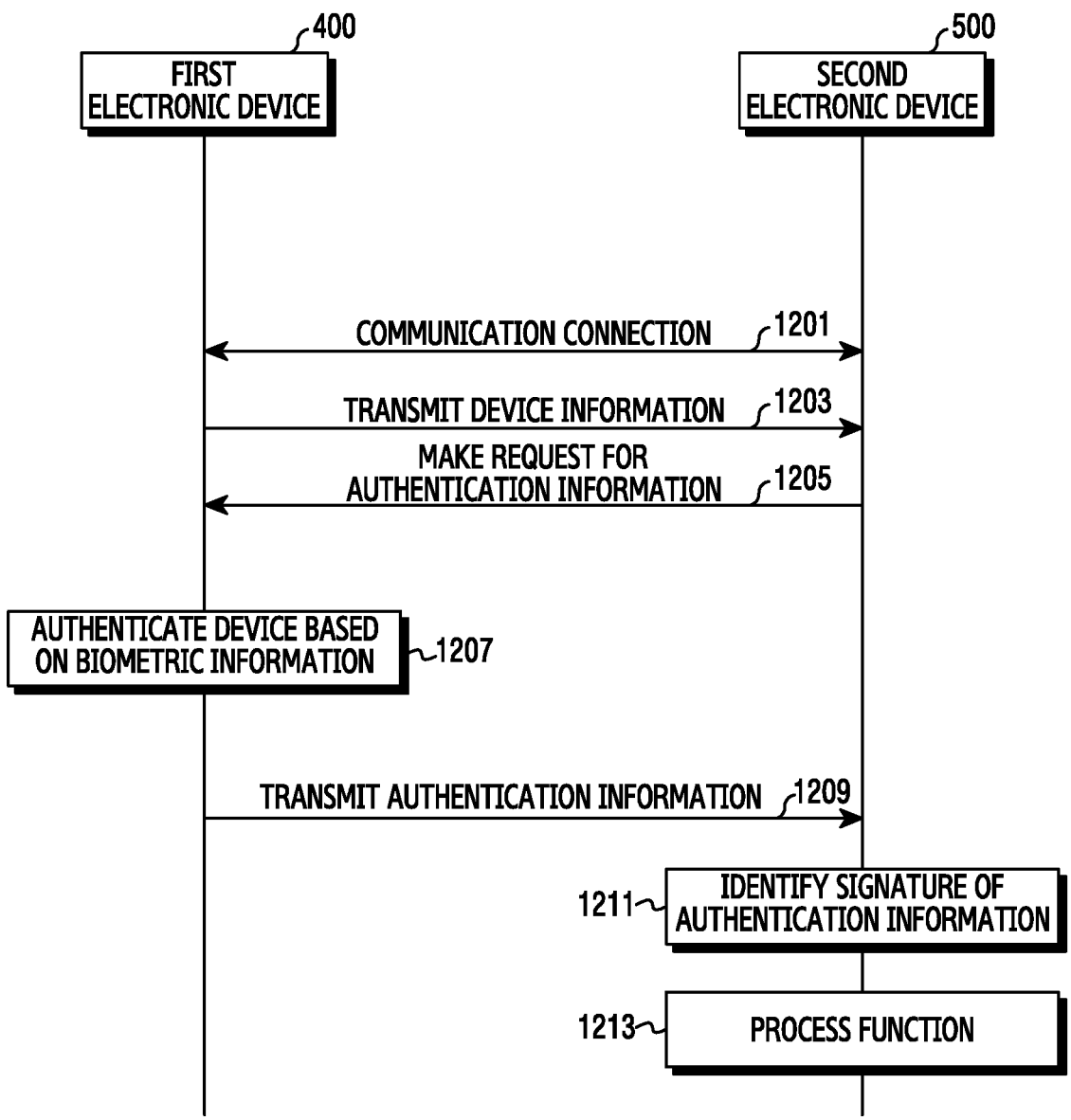
FIG. 12 illustrates an authentication process between electronic devices according to embodiments of the present disclosure.

FIG. 12 illustrates an authentication process between electronic devices according to embodiments of the present disclosure.

Referring to FIG. 12, in step 1201, the first electronic device 400 and the second electronic device 500 may establish a connection for communication therebetween. The first electronic device 400 and the second electronic device 500 may establish the connection for communication using a user's control or the NFC tag 600. When the first electronic device 400 or the second electronic device 500 receives a communication connection request from the counterpart electronic device, the first electronic device 400 or the second electronic device 500 may establish the communication connection with the counterpart electronic device in response to the communication connection request. The first electronic device 400 and the second electronic device 500 may establish Bluetooth communication therebetween.

In step 1203, the first electronic device 400 may transmit device information of the first electronic device 400 to the second electronic device 500 upon establishment of the connection for communication with the second electronic device 500.

In step 1205, the second electronic device 500 may transmit an authentication information request to the first electronic device 400. The second electronic device 500 may be connected for communication with the first electronic device 400 and may determine whether the first electronic device 400 is a device registered as a companion device based on the device information of the first electronic device 400. When the first electronic device 400 is a device registered as a companion device, the second electronic device 500 may make a request for authentication information related to user authentication to the first electronic device 400. The second electronic device 500 may transmit an authentication information request that includes random data. The random data may include a challenge or a random number randomly generated by the second electronic device 500 for authentication between the first electronic device 400 and the second electronic device 500. For example, the second electronic device 500 may transmit a PKI authentication request to the first electronic device 400 based on the random data.

Upon receiving the authentication information request from the second electronic device 500, the first electronic device 400 may perform device authentication based on biometric information in step 1207. The first electronic device 400 may output a relevant interface for acquiring user's biometric information and acquire the user's biometric information. The first electronic device 400 may determine whether the acquired biometric information is valid.

When the device authentication is performed normally, the first electronic device 400 may transmit authentication information to the second electronic device 500 in step 1209. The first electronic device 400 may encrypt and sign authentication information through a private key of the first electronic device 400 and transmit the signed authentication information to the second electronic device 500. The first electronic device 400 and the second electronic device 500 may register an encryption key prearranged therebetween. For example, the first electronic device 400 may store the private key, and the second electronic device 500 may register in advance a public key of the first electronic device 400 corresponding to the private key. When the device authentication is completed, the first electronic device 400 may generate the random data (e.g., PKI authentication request information) received from the second electronic device 500 as first authentication information (signed data that is signed by the first electronic device 400) encrypted through its own private key. When the device authentication is completed, the first electronic device 400 may generate the random data received from the second electronic device 500 and biometric information as encrypted second authentication information (e.g., signature data or biometric information) through its own private key.

Upon receiving authentication information from the first electronic device 400, the second electronic device 500 may identify the signature of the authentication information in step 1211. For example, the second electronic device 500 may verify the received authentication information through the user authenticator (public key) stored in connection with the first electronic device 400. The second electronic device 500 may decrypt the authentication information through the pre-stored public key of the first electronic device 400. The second electronic device 500 may determine whether the decrypted authentication information is valid based on the random data transmitted from the first electronic device 400. For example, the second electronic device 500 may determine whether the decrypted result matches a challenge or random number transmitted from the first electronic device 400. When the first electronic device 400 provides the first authentication information, the second electronic device 500 may decrypt the first authentication information based on the public key (user authenticator) and compare and authenticate signed data of the first authentication information with random data. When the first electronic device 400 provides the second authentication information, the second electronic device 500 may decrypt the second authentication information based on the public key and compare and authenticate signed data of the second authentication information with random data. When the authentication is performed normally, the second electronic device 500 may acquire biometric information of the second authentication information.

In step 1213, the second electronic device 500 may perform the corresponding operation based on the signature identification result of the authentication information. When the second electronic device 500 is booted in a locked state, the second electronic device 500 may perform a logon operation. The second electronic device 500 may perform an operation of inputting information (e.g., login information, payment information, an electronic signature, user authentication, or approval information) required in the state of being used based on the biometric information acquired in the state of being used (e.g., the state in which user information input into a website is needed in a state of access to the website).

Figure 13:
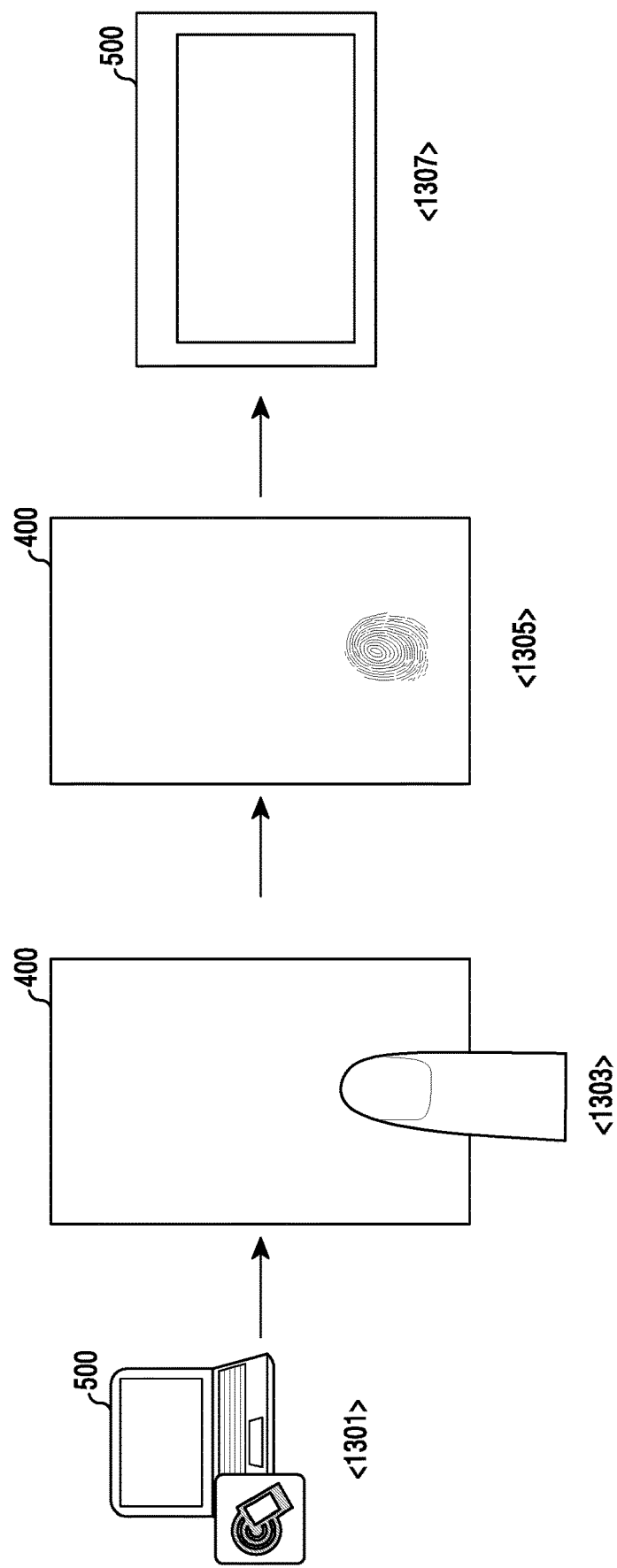
FIG. 13 illustrates an example of a connection and authentication process between electronic devices in a system according to embodiments of the present disclosure.

FIG. 13 illustrates an example of a connection and authentication process between electronic devices in a system according to embodiments of the present disclosure.

Referring to FIG. 13, in step 1301, the first electronic device 400 and the second electronic device 500 may be tagged by the user. The user may bring the first electronic device 400 closer to the NFC tag 600 or bring the first electronic device 400 into contact with the NFC tag 600 (e.g., perform NFC tagging) attached to or installed in the second electronic device 500 in order to trigger the communication connection between the first electronic device 400 and the second electronic device 500. The first electronic device 400 may acquire tag information from the NFC tag 600 according to the NFC tagging and extract connection information related to the communication connection with the second electronic device 500 from the acquired tag information. The connection information may be information required for pairing with the second electronic device 500 and may include a device address (e.g., a MAC address) and a Bluetooth device name. The first electronic device 400 may establish the connection for communication with the second electronic device 500 based on the connection information.

The first electronic device 400 and the second electronic device 500 may determine whether to make the communication connection according to the NFC tagging and connect via wireless communication (e.g., Bluetooth communication) established between the first electronic device 400 and the second electronic device 500. When connection via wireless communication with the first electronic device 400 is performed, the second electronic device 500 may transmit an authentication information request to the first electronic device 400 through the connection based on wireless communication.

After the wireless communication between the first electronic device 400 and the second electronic device 500 is established, the first electronic device 400 may receive the authentication information request from the second electronic device 500 through the established wireless communication in step 1303. When receiving the authentication information request, the first electronic device 400 may wait for the input of biometric information (e.g., fingerprint information in FIG. 13) from the user. The first electronic device 400 may output a relevant a GUI or UI for acquiring user's fingerprint information through a preset sound or may display a relevant guide. The user may input his/her fingerprint through a display or a button (e.g., a home button) including a fingerprint recognition sensor of the first electronic device 400. The user may perform a swipe-type input of dragging an area (e.g., an area of the display or a button) of the first electronic device 400, in which the fingerprint recognition sensor is located, in a predetermined direction or make a fixed-area-type input of putting his/her fingerprint on the area in which the fingerprint recognition sensor is located for a predetermined time.

In step 1305, the first electronic device 400 may scan the user's fingerprint through the fingerprint recognition sensor and perform user authentication based on the scanned image. The first electronic device 400 may acquire a fingerprint image from the image scanned through the fingerprint recognition sensor and determine whether the acquired fingerprint image is valid. For example, the first electronic device 400 may extract features of the fingerprint image acquired through the fingerprint recognition sensor, and compare and/or match the extracted features with feature information of the user (e.g., fingerprint information) pre-registered in the memory so as to perform user authentication. The fingerprint recognition sensor may acquire the fingerprint image through various methods such as an optical type, a semiconductor-device type of detecting capacitance or electric conduction, an ultrasonic-wave type, a heat-detection type, a non-contact type, or a combination thereof. When the user authentication is completed, the first electronic device 400 may transmit the authentication result (e.g., signed data and fingerprint data) to the second electronic device 500.

In step 1307, the second electronic device 500 may receive the authentication result from the first electronic device 400 and perform the corresponding operation based on the authentication result. The second electronic device 500 may perform a relevant operation in accordance with whether or not the second electronic device 500 is being used or with user information that is required for use thereof. For example, when the second electronic device 500 is booted in a locked state, the second electronic device 500 may perform a logon operation based on the user information. According to another example, the second electronic device 500 may perform an operation of inputting information (e.g., account (login) information, payment information, an electronic signature, user authentication, or approval information) required in the state of being used based on the user information received in the state of being used (e.g., the state in which user information input into a website is needed in a state of access to the website).

Figure 14:
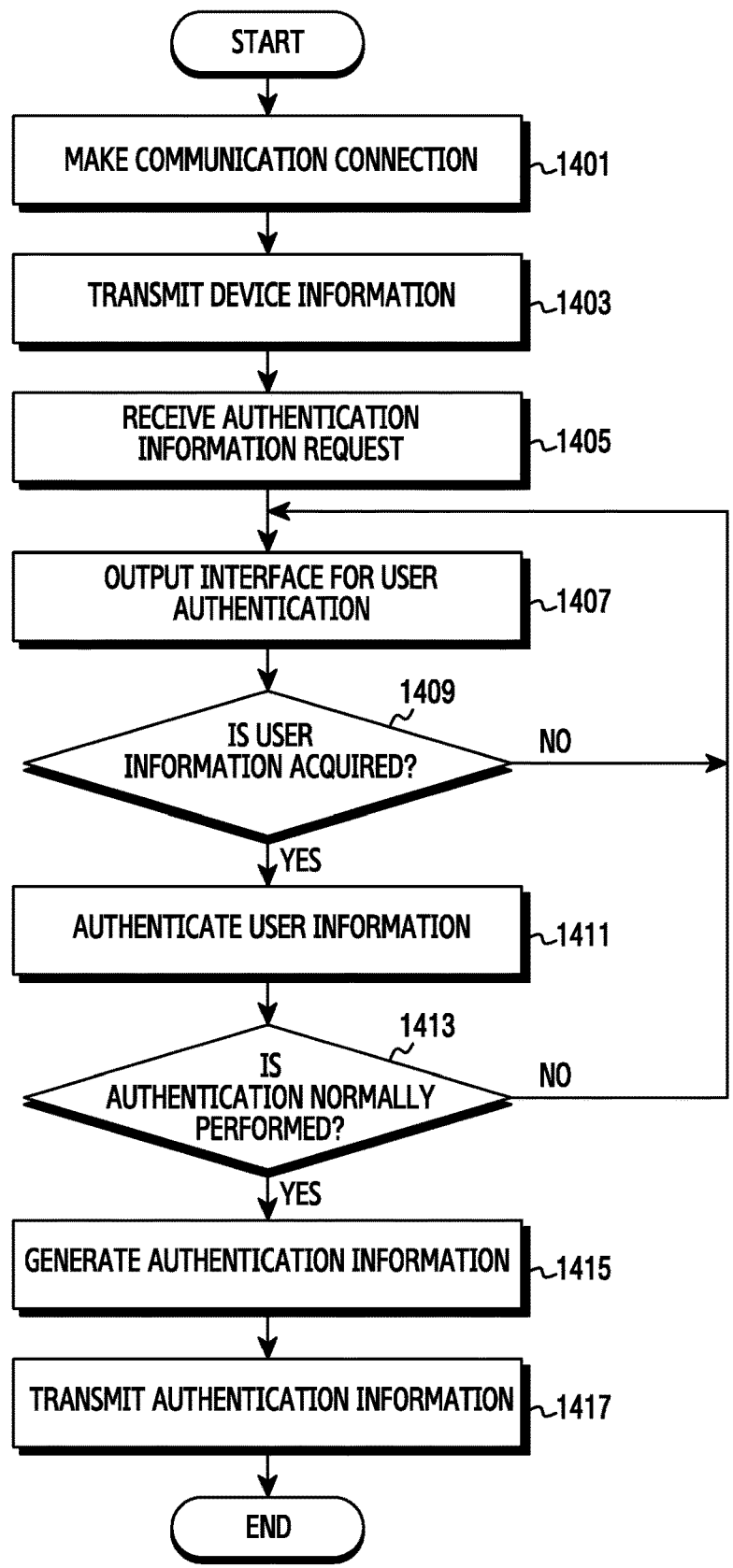
FIG. 14 is a flowchart illustrating the method in which the electronic device provides authentication information to the external device according to embodiments of the present disclosure.

FIG. 14 is a flowchart illustrating the method in which the electronic device provides authentication information to the external device.

In FIG. 14, the electronic device is the first electronic device 400, which provides authentication information to the external device (e.g., the second electronic device 500) based on user's biometric information, and the external device is the second electronic device 500, which makes a request for authentication information to the electronic device. For example, FIG. 14 illustrates an example of a process in which the first electronic device 400 provides authentication information based on biometric information to the second electronic device 500.

Referring to FIG. 14, in step 1401, the processor 210, may make a communication connection with the external device 500.

In step 1403, the processor 210 may transmit device information of the electronic device 400 to the external device in response to the communication connection with the external device.

In step 1405, the processor 210 may receive an authentication information request from the external device.

Upon receiving the authentication information request from the external device, the processor 210 may output a relevant interface for user authentication in step 1407. The processor 210 may output a relevant interface for acquiring user's biometric information and wait for input of the biometric information from the user. The processor 210 may activate a biometric recognition mode to acquire the biometric information. The processor 210 may display an item (e.g., text or an icon) for guiding fingerprint input in an area of the display having the fingerprint recognition sensor therein and activate the fingerprint recognition mode.

In step 1409, the processor 210 may determine whether user information is acquired. For example, the processor 210 may determine whether there is data (e.g., iris information or fingerprint information) sensed through a biometric recognition module.

When user information is not acquired in step 1409 (No in step 1409), the processor 210 may proceed to step 1407 and perform steps after step 1407. The processor 210 may wait for user input for a preset time, and end the step when there is no user input for the preset time.

When the user information is acquired in step 1409 (Yes in step 1409), the processor 210 may perform authentication for the user information in step 1411. The processor 210 may scan the user's fingerprint through the fingerprint recognition sensor and perform user authentication based on the scanned image. For example, the processor 210 may acquire the fingerprint image from the scanned image and compare the acquired fingerprint image with at least one fingerprint image preset by the user.

In step 1413, the processor 210 may determine whether the acquired user information is normally authenticated. For example, the processor 210 may determine whether the acquired fingerprint image is valid according to whether the acquired fingerprint image matches the preset fingerprint image.

When it is determined that the user information is not valid in step 1413 (No in step 1413), the processor 210 may proceed to step 1407 and perform steps subsequent to step 1407. For example, when the acquired fingerprint image does not match the preset fingerprint image, the processor 210 may provide a guide (e.g., output a notification message or vibration feedback indicating mismatched user information) and receive user information again. The processor 210 may perform authentication for the user information a predetermined number of times and, when the authentication for the user information fails the predetermined number of times, the processor 210 may end the operation.

When it is determined that the user information is valid in step 1413 (Yes in step 1413), the processor 210 may generate authentication information in step 1415. The processor 210 may encrypt and sign authentication information received from the external device and the acquired biometric information through a private key (user authenticator) of the electronic device 400.

In step 1417, the processor 210 may transmit the authentication information to the external device through wireless communication connected with the external device.

Figure 15:
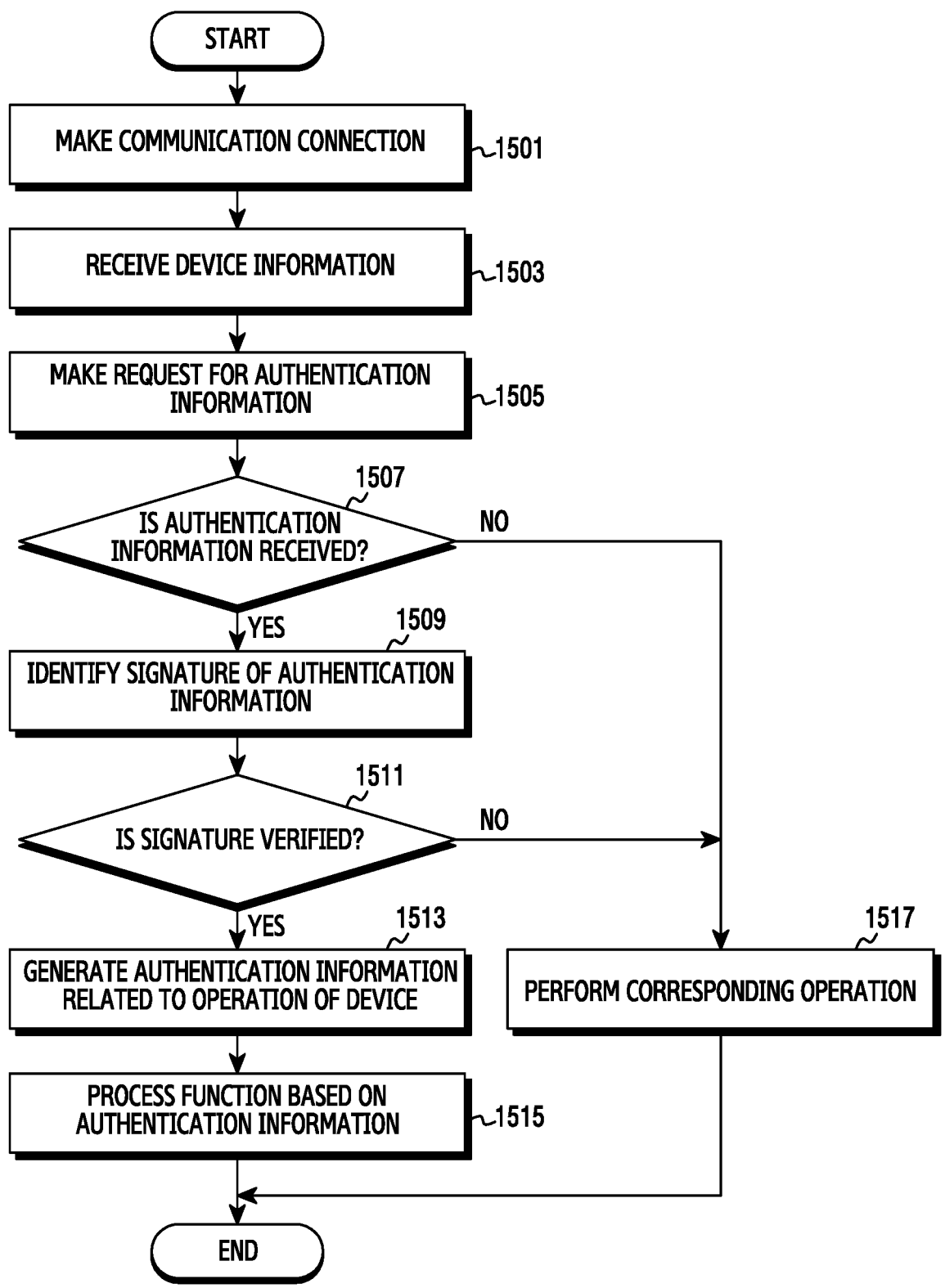
FIG. 15 is a flowchart illustrating the method in which the electronic device authenticates the external device according to embodiments of the present disclosure.

FIG. 15 is a flowchart illustrating the method in which the electronic device authenticates the external device according to embodiments of the present disclosure.

In FIG. 15, the electronic device is the second electronic device 500, which makes a request for authentication information to the external device, and the external device is the first electronic device 400, which acquires user's biometric information in response to the authentication information request from the electronic device and provides the user's biometric information to the electronic device. For example, FIG. 15 illustrates an example of a process in which the second electronic device 500 authenticates authentication information of the first electronic device 400.

Referring to FIG. 15, in step 1501, the processor 210 of the electronic device 500 may make a communication connection with the external device 400. The processor 210 may accept the communication connection with the external device in response to the communication connection request from the external device and establish the communication connection with the external device.

In step 1503, the processor 210 may receive device information of the external device in response to the communication connection with the external device. The processor 210 may be connected for communication with the external device and determine whether the external device is a device registered as a companion device based on the device information of the external device.

In step 1505, the processor 210 may transmit an authentication information request to the external device. When the communication connection with the external device is established and the external device is the device registered as the companion device, the processor 210 may make a request for transmitting authentication information to the external device.

In step 1507, the processor 210 may determine whether authentication information is received from the external device.

When there is no reception of authentication information from the external device in step 1507 (No of step 1507), the processor 210 may process the corresponding step in step 1517. The processor 210 may wait to receive the authentication information for a set predetermined time, and, when the predetermined time passes, end the device registration procedure. The processor 210 may periodically transmit the authentication key registration request to the communication-connected external device after the predetermined amount of time has passed or for a predetermined number of times (or a predetermined time). When there is no reception of authentication information from the external device, the processor 210 may provide the user with a guide (e.g., a popup) prompting to identify the state of the external device.

When authentication information is received from the external device in step 1507 (Yes in step 1507), the processor 210 may identify a signature of the authentication information in step 1509. For example, the processor 210 may verify the signature of the received authentication information through a user authenticator (public key) stored in association with the external device.

In step 1511, the processor 210 may determine whether the signature of the authentication information is a verified signature. The processor 210 may determine whether the authentication information is valid by verifying the received authentication information (identifying signature). The processor 210 may verify the received authentication information through the pre-stored user authenticator (public key) of the external device. The processor 210 may decrypt received encrypted authentication information through the user authenticator (public key) of the external device. The processor 210 may determine whether the decrypted authentication information is valid based on PKI authentication request information transmitted to the external device. For example, the processor 210 may determine whether the decrypted result (e.g., decrypted PKI authentication request information) is the same as the PKI authentication request information transmitted to the external device.

When the signature of the authentication information is not verified in step 1511 (No in step 1511), the processor 210 may perform the corresponding step in step 1517. The processor 210 may make a request for authentication information to the external device again, end the authentication process by the external device, or perform a preset operation of providing a relevant guide (e.g., error information) to the user.

When the signature of the authentication information is verified in step 1511 (Yes in step 1511), the processor 210 may generate authentication information related to the operation of the electronic device 800 in step 1513. The processor 210 may generate symmetric-key authentication information corresponding to the external device based on the symmetric key stored in the secure area (e.g., TrustZone) of the electronic device 500.

In step 1515, the processor 210 may perform the step related to function processing based on the symmetric-key authentication information. The processor 210 may perform a logon operation based on the symmetric-key authentication information when the processor 210 is booted in the locked state. According to another example, the processor 210 may perform an operation of inputting information required in the state in which the electronic device 500 is being used based on the symmetric-key authentication information in the state of being used (e.g., the state in which user information input into a website is needed in order to access the website).

Figure 16:
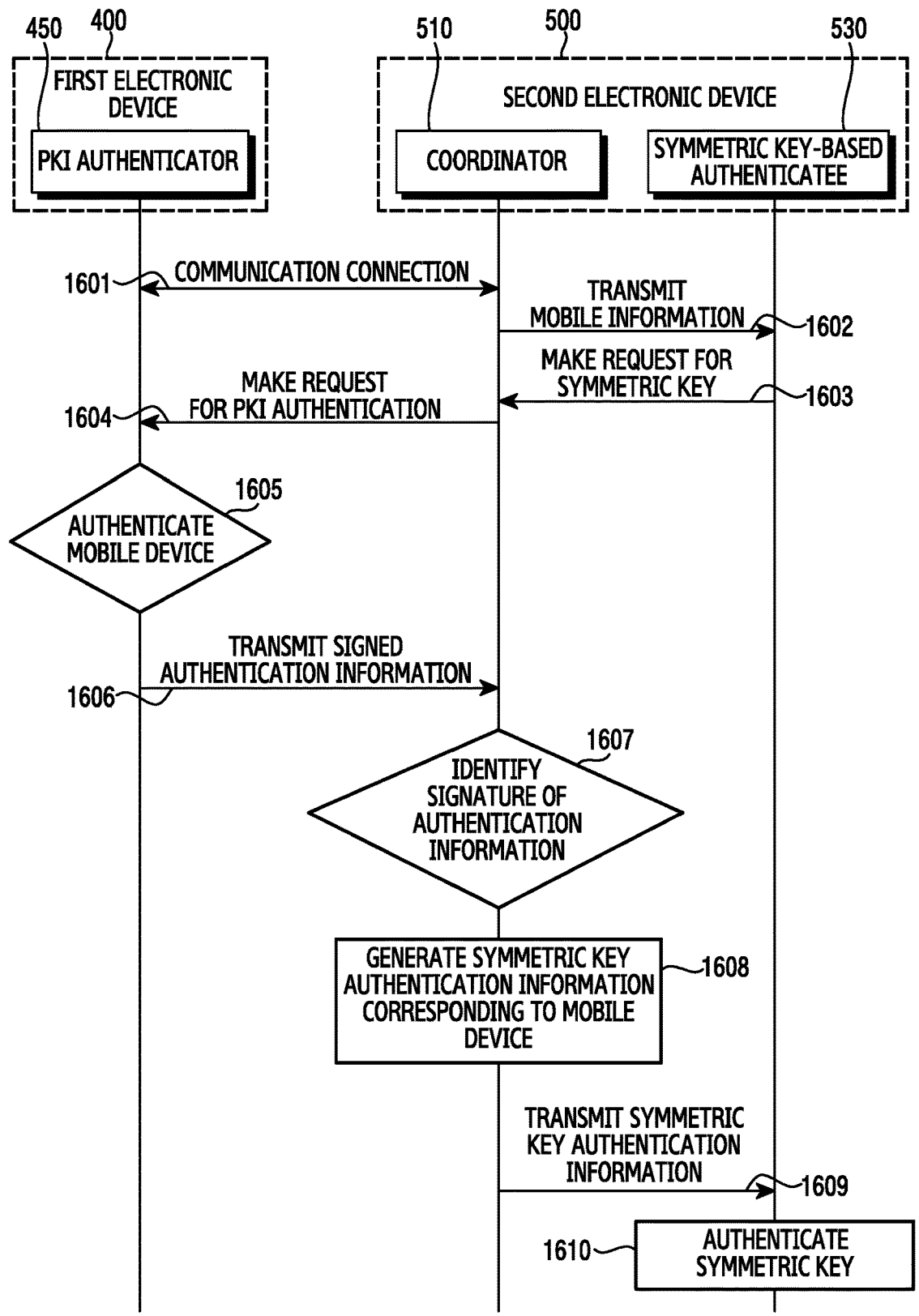
FIG. 16 illustrates a device authentication process between electronic devices according to embodiments of the present disclosure.

FIG. 16 illustrates a device authentication process between electronic devices.

As illustrated in FIG. 16, a system according to embodiments of the present disclosure may include the first electronic device 400 including a biometric recognition module and a second electronic device 500 that does not include a biometric recognition module. The first electronic device 400 may include the PKI authenticator 450 in connection with authentication processing between electronic devices. The second electronic device 500 may include the coordinator 510 and the SKI authenticatee 530 in association with authentication processing between electronic devices.

Referring to FIG. 16, in step 1601, the first electronic device 400 and the second electronic device 500 may establish a connection for communication therebetween. The first electronic device 400 and the second electronic device 500 may establish the communication connection through user control or the NFC tag 600. When the first electronic device 400 or the second electronic device 500 receives a communication connection request from the counterpart electronic device, the first electronic device 400 or the second electronic device 500 may establish the communication connection with the counterpart electronic device in response to the communication connection request. The first electronic device 400 and the second electronic device 500 may establish Bluetooth communication therebetween.

In step 1602, the coordinator 510 of the first electronic device 400 may transmit device information of the first electronic device 400 to the SKI authenticatee 530 upon establishing communication connection with the second electronic device 500. The coordinator 510 may read device information corresponding to the communication-connected first electronic device 400 from the database and transmit the device information of the first electronic device 400 to the SKI authenticatee 530.

In step 1603, the SKI authenticatee 530 of the second electronic device 500 may transmit a symmetric-key authentication request to the coordinator 510. The SKI authenticatee 530 may generate a nonce and transmit the symmetric-key authentication request to the coordinator 510.

In step 1604, the coordinator 510 of the second electronic device 500 may transmit a PKI authentication request to the first electronic device 400 in response to the symmetric-key authentication request of the SKI authenticatee 530. The coordinator 510 may transmit the PKI authentication request to the first electronic device 400 based on random data such as challenge, a random number, an application identifier (e.g., App ID), or a key identifier (key ID). Upon receiving the PKI authentication request from the second electronic device 500 through wireless communication, the first electronic device 400 may transmit the received PKI authentication request to the PKI authenticator 450. The random data may include data randomly generated by the second electronic device 500 for authentication between the first electronic device 400 and the second electronic device 500.

In step 1605, upon receiving the PKI authentication request from the second electronic device 500, the PKI authenticator 450 of the first electronic device 400 may perform device authentication based on biometric information. The PKI authenticator 450 may output a relevant interface for acquiring user's biometric information and acquire the user's biometric information. The PKI authenticator 450 may determine whether the acquired biometric information is valid.

When the device authentication is performed normally, the PKI authenticator 450 of the first electronic device 400 may transmit signed authentication information to the second electronic device 500 through wireless communication in step 1606. The PKI authenticator 450 may encrypt and sign authentication information through a user private key possessed by the first electronic device 400 and transmit the signed authentication information to the second electronic device. The first electronic device 400 and the second electronic device 500 may register an encryption key pre-arranged therebetween. For example, the first electronic device 400 may store the private key, and the second electronic device 500 may register in advance a public key of the first electronic device 400 corresponding to the private key. Upon receiving the signed authentication information through wireless communication, the second electronic device 500 may transmit the received signed authentication information to the coordinator 510.

Upon receiving the signed authentication information from the first electronic device 400, the coordinator 510 may identify the signature of the authentication information in step 1607. The coordinator 510 may verify the received authentication information through the user authenticator (public key) stored in connection with the first electronic device 400. The coordinator 510 may decrypt the authentication information through the pre-stored public key of the first electronic device 400. The coordinator 510 may determine whether the decrypted authentication information is valid based on PKI authentication request information (e.g., random data) transmitted to the first electronic device 400. For example, the coordinator 510 may determine whether the decrypted result is the same as the PKI authentication request information that the second electronic device 500 transmits to the first electronic device 400.

When the signature of the authentication information is identified, the coordinator 510 of the second electronic device 500 may generate symmetric-key authentication information corresponding to the first electronic device 400 in step 1608. The coordinator 510 may generate symmetric-key authentication information by encrypting the nonce transmitted from the SKI authenticator 530 based on the symmetric key pre-stored in the TrustZone such as the TPM.

In step 1609, the coordinator 510 of the second electronic device 500 may transmit the symmetric-key authentication information to the SKI authenticatee 530.

In step 1610, the SKI authenticatee 530 of the second electronic device 500 may perform symmetric-key authentication.

When the symmetric-key authentication is performed normally, the second electronic device 500 may perform a relevant operation using biometric information of the first electronic device 400. When the second electronic device 500 is booted in a locked state, the second electronic device 500 may perform a logon operation. The second electronic device 500 may make a request for login to an OS (e.g., Windows OS) of the second electronic device 500 based on the received authentication information. The second electronic device 500 may perform an operation of inputting information (e.g., login information, payment information, an electronic signature, user authentication, or approval information) required for use thereof based on the biometric information acquired in the state of being used (e.g., the state in which user information input into a website is needed in order to access the website).

Figure 17A:
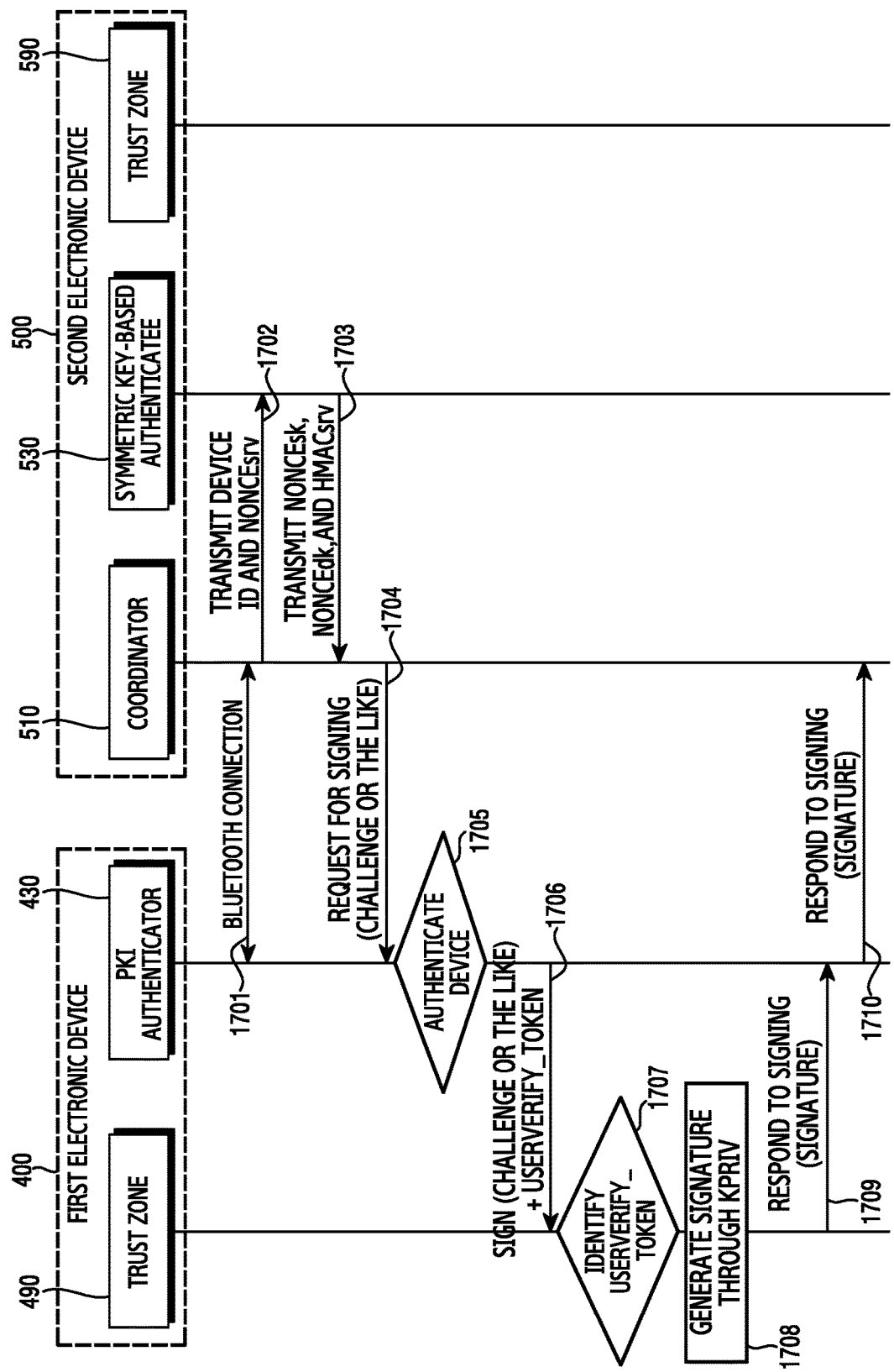
FIGS. 17A and 17B illustrate a device authentication process in a system according to embodiments of the present disclosure.
Figure 17B:
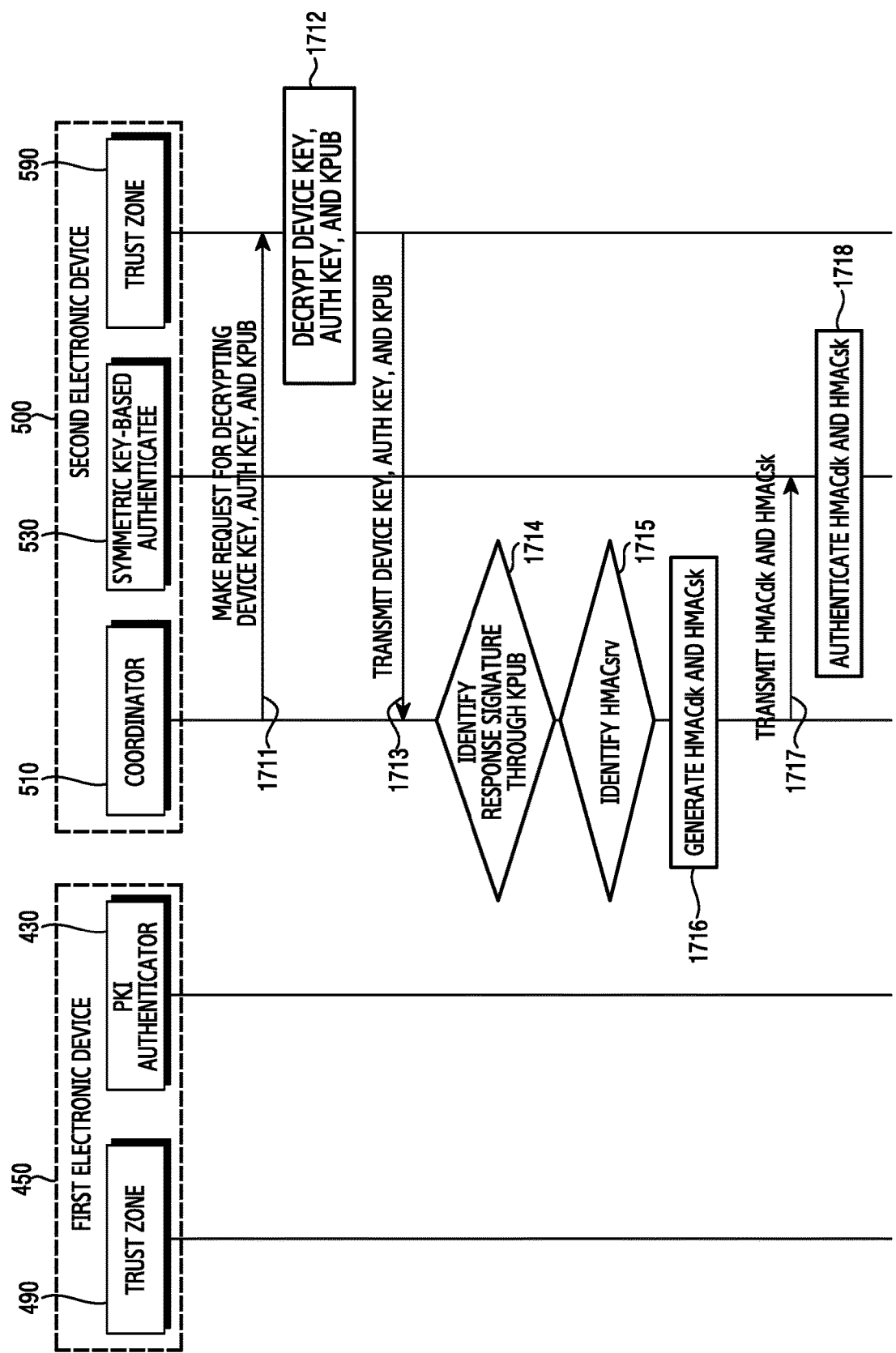

FIGS. 17A and 17B illustrate a device authentication process in a system according to embodiments of the present disclosure.

As illustrated in FIGS. 17A and 17B, the system includes the first electronic device 400 including a biometric recognition module and the second electronic device 500, which does not include a biometric recognition module. The first electronic device 400 may include the PKI authenticator 450 in connection with authentication processing between electronic devices and the TrustZone 490. The second electronic device 500 may include the coordinator 510, the SKI authenticatee 530, and the TrustZone 590 in association with authentication processing between electronic devices.

Referring to FIGS. 17A and 17B, in step 1701, the first electronic device 400 and the second electronic device 500 may establish a connection for communication therebetween. The coordinator 510 may be functionally connected for communication with the PKI authenticator 450 of the first electronic device 400. The first electronic device 400 and the second electronic device 500 may establish Bluetooth communication therebetween.

In step 1702, the coordinator 510 of the first electronic device 400 may transmit device information (device ID) of the first electronic device 400 and a service nonce (NONCEsrv) to the SKI authenticatee 530 in response to the communication connection with the second electronic device 500. The coordinator 510 may read device information corresponding to the communication-connected first electronic device 400 from the database and transmit the device information of the first electronic device 400 to the SKI authenticatee 530.

In step 1703, the SKI authenticatee 530 of the second electronic device 500 may transmit a symmetric-key authentication request to the coordinator 510. According to an embodiment, the SKI authenticatee 530 may transmit a secret key (SK) nonce (NONCEsk), a decryption key (DK) nonce (NONCEdk), and a service hash-based message authentication code (HMACsrv) to the coordinator 510 so as to transmit a symmetric-key authentication request for the first electronic device 400.

In step 1704, the coordinator 510 of the second electronic device 500 may transmit a PKI authentication request to the first electronic device 400 in response to the symmetric-key authentication request of the SKI authenticatee 530. The coordinator 510 may transmit a signature request to the first electronic device 400 based on random data such as a challenge, a random number, an App ID, or a key ID. Upon receiving the signature request (e.g., the PKI authentication request) from the second electronic device 500 through wireless communication, the first electronic device 400 may transmit the received signature request to the PKI authenticator 450. The random data may include data randomly generated by the second electronic device 500 for authentication between the first electronic device 400 and the second electronic device 500.

Upon receiving the signature request from the second electronic device 500, the PKI authenticator 450 of the first electronic device 400 may perform device authentication based on biometric information in step 1705.

When the device authentication is performed normally, the PKI authenticator 450 of the first electronic device 400 may transmit the signature request to the TrustZone 490 in step 1706. When the signature request is made, the PKI authenticator 450 may transmit the random data and make a request for a user name token (userverify_token) to the TrustZone 490. The user name token may indicate a token which may be received in biometric information authentication.

In step 1707, the TrustZone 490 of the first electronic device 400 may identify the stored user name token.

When the user name token is identified, the TrustZone 490 of the first electronic device 400 may generate a signature through a Kpriv in step 1708. The TrustZone 490 may sign the authentication information through the user private key. The TrustZone 490 may encrypt and sign the authentication information through the user private key possessed by the first electronic device 400.

In step 1709, the TrustZone 490 of the first electronic device 400 may respond to the signature request from the PKI authenticator 450 and transmit a signature response to the PKI authenticator 450. The TrustZone 490 may transmit the signed authentication information to the PKI authenticator 450.

In step 1710, the PKI authenticator 450 of the first electronic device 400 may transmit the registration response corresponding to the signature request of the second electronic device 500 (e.g., the coordinator 510) to the coordinator 510. The PKI authenticator 450 may transmit the signed authentication information to the second electronic device 500 through wireless communication. The first electronic device 400 and the second electronic device 500 may register an encryption key prearranged therebetween. For example, the first electronic device 400 may store the private key, and the second electronic device 500 may register in advance a public key of the first electronic device 400 corresponding to the private key. Upon receiving the signed authentication information through wireless communication, the second electronic device 500 may transmit the received signed authentication information to the coordinator 510.

In step 1711, the coordinator 510 of the second electronic device 500 may make a request for decrypting the pre-stored encrypted symmetric key (e.g., the device key or the auth key) and the Kpub to the TrustZone 590.

In step 1712, the TrustZone 590 of the second electronic device 500 may decrypt the pre-stored symmetric key and the Kpub from the coordinator 510 in response to the decryption request from the coordinator 510.

In step 1713, the TrustZone 590 of the second electronic device 500 may transmit the decrypted symmetric key (e.g., the device key or the auth key) and the decrypted Kpub to the coordinator 510.

In step 1714, the coordinator 510 of the second electronic device 500 may identify a signature of the signed authentication information. The coordinator 510 may identify a signature of the signature response received from the first electronic device 400 through the decrypted Kpub. Upon receiving the signed authentication information from the first electronic device 400, the coordinator 510 may identify the signature of the authentication information. The coordinator 510 may verify the received authentication information through the user authenticator (public key) stored in connection with the first electronic device 400.

In step 1715, the coordinator 510 of the second electronic device 500 may identify HMACsrv.

When the signature of the authentication information is identified, the coordinator 510 of the second electronic device 500 may generate symmetric-key authentication information corresponding to the first electronic device 400 in step 1716. When the signature and HMACsrv are identified, the coordinator 510 may generate the decryption key (DK) HMAC (HMACdk) and the secret key (SK) HMAC (HMACsk). The coordinator 510 may generate symmetric-key authentication information by encrypting the NONCEsk and NONCEdk transmitted from the SKI authenticatee 530 based on the symmetric key pre-stored in the TrustZone 590. The coordinator 510 may generate HMACdk based on "HMAC-SHA256 (device key, NONCEdk)" and HMACsk based on "HMAC-SHA256 (AuthKey, HMACdk|| NONCEsk)".

In step 1717, the coordinator 510 of the second electronic device 500 may transmit the symmetric-key authentication information to the SKI authenticatee 530. The coordinator 510 may transmit HMACdk and HMACsk to the SKI authenticatee 530.

In step 1718, the SKI authenticatee 530 of the second electronic device 500 may perform symmetric-key authentication. The SKI authenticatee 530 may authenticate HMACdk and HMACsk.

When the symmetric-key authentication is performed normally, the second electronic device 500 may perform a relevant operation using biometric information of the first electronic device 400. When the second electronic device 500 is booted in a locked state, the second electronic device 500 may perform a logon operation. The second electronic device 500 may make a request for login to an OS of the second electronic device 500 based on the received authentication information. The second electronic device 500 may perform an operation of inputting information (e.g., login information, payment information, an electronic signature, user authentication, or approval information) required for use thereof based on the biometric information acquired during use thereof (e.g., the state in which user information input into a website is needed during access to the website).

As described above, the method of the present disclosure includes registering, in an external device, authentication information for authenticating the external device through the electronic device; establishing a communication connection with the external device through a wireless communication unit; receiving a request for authenticating the electronic device from the external device in response to the communication connection; acquiring biometric information corresponding to a user of the electronic device through a biometric recognition module in response to the authentication request; performing device authentication for the user based on at least the biometric information; encrypting authentication information when the authentication is successfully performed; and transmitting the encrypted authentication information to the external device.

The step of registering the authentication information in the external device may include receiving a PKI registration request from the external device when the authentication information is registered in the external device.

The step of receiving the authentication request may include receiving a PKI authentication request from the external device.

The step of encrypting the authentication information may include signing the authentication information through a user private key of the electronic device.

As described above, the method of the present disclosure includes registering an external device as a companion device of the electronic device based on authentication information of the external device; establishing a communication connection with the external device through a wireless communication unit; transmitting an authentication request to the external device in response to the communication connection; receiving authentication information from the external device in response to the authentication request; identifying a signature for the received authentication information; and processing authentication of the electronic device through the external device when the signature of the authentication information is identified.

The step of registering the external device may include making a request for registering PKI in the external device in response to a symmetric registration request corresponding to the external device.

The step of registering the external device may include receiving authentication information including attestation and a user authenticator from the external device in response to the PKI registration request; and identifying a signature of the attestation based on a root certificate stored in the electronic device in response to the reception of the authentication information and identifying a signature of the user authenticator based on the identified attestation.

The step of registering the external device may further include generating and storing a symmetric key for symmetric-key authentication of the external device based on the identification of the signature of the authentication information; and mapping and storing PKI authentication and symmetric-key authentication in order to link a PKI authentication scheme and a symmetric-key authentication scheme for the external device, and the symmetric key for the symmetric-key-based authentication scheme may be configured not to be exposed to the external device.

The step of transmitting the authentication request may include making a request for PKI authentication to the external device in response to a symmetric-key authentication request corresponding to the external device.

The step of identifying the signature may include identifying the signature of the authentication information based on a public key when the authentication information is received from the external device.

An electronic device and a method according to embodiments of the present disclosure may more simply provide information required for user authentication of a second electronic device, which does not include a biometric recognition module, through a first electronic device including a biometric recognition module while maintaining security. Through a wireless communication connection between the first electronic device and the second electronic device, the first electronic device may acquire information related to user authentication required by the second electronic device and may automatically provide the acquired information to the second electronic device. Accordingly, the user may more conveniently and easily perform a task related to user authentication even though the user uses the second electronic device which does not include the biometric recognition module.

In an authentication process by the wireless communication connection between the first electronic device and the second electronic device, it is possible to more safely perform authentication between the electronic devices by applying public-key-based authentication to device-to-device (D2D) authentication without a certification server. In the authentication process between the first electronic device, it is possible to solve a security threat during a key exchange step, which is a weak point of a symmetric-key-based authentication scheme, and accordingly to provide a safer authentication process for the authentication (e.g., D2D authentication) between the electronic devices. Because an electronic device (e.g., a PC) which does not include a biometric recognition module uses a coordinator corresponding to an agent for linking symmetric-key-based authentication infrastructure and public-key-based authentication infrastructure, requirements that should be supported by various platforms of the electronic device may be satisfied. The electronic device may contribute to improving the usability, convenience, security, and compatibility of the electronic device.

The embodiments of the present disclosure disclosed herein and shown in the drawings are merely examples presented in order to easily describe technical details of the present disclosure and to help the understanding of the present disclosure, and are not intended to limit the scope of the present disclosure. Therefore, it should be construed that, in addition to the embodiments disclosed herein, all modifications and changes or modified and changed forms derived from the technical idea of the present disclosure fall within the scope of the present disclosure.

What is claimed is:

1. An electronic device comprising:
a wireless communication unit configured to perform wireless communication with an external device;
a memory; and
a processor connected to the wireless communication unit and the memory,
wherein the processor is configured to:
register the external device as a companion device of the electronic device based on first authentication information of the external device,
establish a communication connection with the external device through the wireless communication unit,
transmit an authentication request to the external device in response to the communication connection,
receive second authentication information from the external device in response to the authentication request,
identify a signature for the received second authentication information, and
process authentication of the electronic device through the external device when the signature of the second authentication information is identified,
wherein the processor is further configured to:
make a request for registering a public key infrastructure (PKI) in the external device in response to a symmetric registration request corresponding to the external device,
receive the first authentication information including attestation and a user authenticator from the external device in response to the request for registering the PKI,
identify a signature of the attestation based on a root certificate stored in the electronic device in response to the reception of the first authentication information,
identify a signature of the user authenticator based on the identified attestation,
generate and store a symmetric key for symmetric-key authentication of the external device based on the identification of the signature of the first authentication information, and
map and store a PKI authentication key and the symmetric key, and wherein the symmetric key is configured not to be exposed to the external device.

2. The electronic device of claim 1, wherein the processor is further configured to make a request for PKI authentication to the external device in response to a symmetric-key authentication request corresponding to the external device.

3. The electronic device of claim 1, wherein the processor is further configured to identify the signature of the second authentication information based on a public key when the second authentication information is received from the external device.

4. A method of operating an electronic device, the method comprising:
registering an external device as a companion device of the electronic device based on first authentication information of the external device;
establishing a communication connection with the external device through a wireless communication unit;
transmitting an authentication request to the external device in response to the communication connection;
receiving second authentication information from the external device in response to the authentication request;
identifying a signature for the received second authentication information; and
processing authentication of the electronic device through the external device when the signature of the second authentication information is identified,
wherein registering the external device comprises:
making a request for registering a public key infrastructure (PKI) in the external device in response to a symmetric registration request corresponding to the external device;
receiving the first authentication information including attestation and a user authenticator from the external device in response to the request for registering the PKI;
identifying a signature of the attestation based on a root certificate stored in the electronic device in response to receiving the first authentication information;
identifying a signature of the user authenticator based on the identified attestation;
generating and storing a symmetric key for symmetric-key authentication of the external device based on identifying the signature of the first authentication information; and
mapping and storing a PKI authentication key and the symmetric key, and wherein the symmetric key is configured not to be exposed to the external device.

5. The method of claim 4, wherein transmitting the authentication request comprises making a request for PKI authentication to the external device in response to a symmetric-key authentication request corresponding to the external device.

6. The method of claim 4, wherein the signature of the second authentication information is based on a public key when the second authentication information is received from the external device.

* * * * *